US012754808B2

(12) United States Patent
Madhuvanthi Janarthanam

(10) Patent No.: US 12,754,808 B2
(45) Date of Patent: *Oct. 6, 2026

(54) ASYNCHRONOUS REGION-AWARE PREFETCHING AND CACHING

(71) Applicant: NetApp, Inc., San Jose, CA (US)

(72) Inventor: Madhuvanthi Janarthanam, Erie, CO (US)

(73) Assignee: NetApp, Inc., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/959,207

(22) Filed: Nov. 25, 2024

(65) Prior Publication Data

US 2025/0094293 A1 Mar. 20, 2025

Related U.S. Application Data

(63) Continuation of application No. 17/892,451, filed on Aug. 22, 2022, now Pat. No. 12,153,501.

(51) Int. Cl.
*G06F 11/1446* (2026.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 10,002,247 | B2 | 6/2018 | Suarez et al. |
| 10,430,378 | B1 | 10/2019 | Harter et al. |
| 11,550,672 | B1 | 1/2023 | Kurian et al. |
| 11,573,816 | B1 | 2/2023 | Featonby et al. |
| 12,153,501 | B2 | 11/2024 | Madhuvanthi |
| 2017/0063722 | A1 | 3/2017 | Cropper et al. |
| 2021/0182156 | A1 | 6/2021 | Sharma et al. |
| 2022/0138169 | A1 | 5/2022 | Yelheri et al. |
| 2022/0147409 | A1 | 5/2022 | Linck et al. |
| 2022/0197555 | A1 | 6/2022 | Benhanokh et al. |
| 2024/0061751 | A1 | 2/2024 | Janarthanam |

OTHER PUBLICATIONS

"CDNs vs Caching: What are they and How are they Different?", Feb. 2020, Allen Longstreet, Ezoic, from the Internet at: https://www.ezoic.com/cdn-and-caching-difference/, 14 pgs.

(Continued)

*Primary Examiner* — Eddy Cheung
(74) *Attorney, Agent, or Firm* — Cooper Legal Group, LLC

(57) ABSTRACT

Techniques are provided for implementing asynchronous region-aware caching for snapshot prefetching and restore. A first application within a first container of a container orchestration platform may be hosted at a first region of a multi-cloud environment. A second application within a second container of the container orchestration platform may be hosted at a second region of the multi-cloud environment. Data of the first application may be stored within storage located within the first region of the multi-cloud environment. In response to determining that the second application has a threshold probability of accessing the data of the first application (e.g., a snapshot that the second application can restore), the data may be cached as cached data within a network edge of the second region for access by the second application.

29 Claims, 16 Drawing Sheets

(56) References Cited

OTHER PUBLICATIONS

"Content Delivery Network", Aug. 2022, Wikipedia, Reprinted from the Internet at: https://en.wikipedia.org/wiki/ 13 pgs.
Content Delivery Networks—What is a CDN?, 2022, Akamai Our Thinking, Akamai Technologies, Reprinted from the Internet at: https://www.akamai.com/our-thinking/cdn/what-is-a-cdn, 11 pages.
"Control Azure CDN Caching Behavior with Caching Rules", Jan. 2022, Microsoft Does, Reprinted from the Internet https://does.microsoft.com/en-us/azure/cdn/cdn-caching-rules-tutorial, 7 pgs.
"Discontent and Disruption in the World of Content Delivery Networks", Jun. 2017, Mahendra Ramsinghani, TechCrunch, Reprinted from the Internet at: https://techcrunch.com/2017/06/01/discontent-and-disruption-in-the-world-of-content-delivery-etworks/, 14 pgs.
"How Caching Works with CloudFront Edge Locations", 2022, Amazon CloudFront, Amazon Web Services, Inc., Reprinted from the Internet at: https://does.aws.amazon.com/AmazonCloudFront/latest/DeveloperGuide/cache-hit-ratio-explained.html, 1 pg.
"How Containers Can Improve Content Delivery Networks", Jul. 2020, Chris Tozzi, GigaOM;s radar Report for Managed Kubernetes, Reprinted from the Internet at: https://platform9.com/blog/how-containers-can-improve-content-delivery-networks/, 4 pages.
"Internet Geolocation", Jul. 2022, Wikipedia, Reprinted from the Internet at: https://en.wikipedia.org/wiki/ 7 pages.
"Low-Latency Content Delivery Network (CDN)", Amazon CloudFront, Amazon Web Services, Reprinted from the at: https://aws.amazon.com/cloudfront/, 8 pages.
"Managing How Long Content Stays in the Cache (Expiration)", Jun. 2015, Amazon CloudFront, Reprinted from the Internet at: https://docs.aws.amazon.com/AmazonCloudFront/latest/DeveloperGuide/Expiration.html, 9 pages.
Maurya A., et al., "GPU-Enabled Asynchronous Multi-level Checkpoint Caching and Prefetching," HAL Open Science, Jun. 7, 2023, 14 Pages.
NetApp., "NetApp E-Series Storage Systems Initial Configuration and Software Installation for SANtricity Storage Manager 11.10," 2013, 96 Pages.
Ney J., "Using a CDN for your Static Assets Served by Kubernetes", Nov. 2019, Published in ITNEXT, Reprinted from the Internet at: https://itnext.io/using-a-cdn-for-your-static-assets-served-by kubernetes-2445e1ff75f, 6 pages.
Non-Final Office Action mailed on Mar. 20, 2024 for U.S. Appl. No. 17/892,451, filed Aug. 22, 2022, 11 pages.
Notice of Allowance mailed on Jul. 26, 2024 for U.S. Appl. No. 17/892,451, filed Aug. 22, 2022, 08 pages.
"Optimizing caching and Availability", 2022, Amazon CloudFront, Amazon Web Services, Inc., Reprinted from the Internet at: https://docs.aws.amazon.com/AmazonCloudFront/latest/DeveloperGuide/ConfiguringCaching.html, 1 page.
Rasheed I., "How to Build Your Own CDN with Kubernetes", Mar. 2019, Design and Code to Deploy a Self-Hosted Content Delivery Network, Published in Insight, Reprinted from the Internet at: https://blog.insightdatascience. com/how-to-build-your-own-cdn-with-kubernetes-5cab00d5c258, 12 pages.
Rosenberg D., "Unified Cloud Interfaces on the Horizon", Nov. 2008, CNET, Tech-Services & Software, Reprinted from the Internet at: https://www.enet.com/tech/services-and-software/unified-cloud-interfaces-on-the horizon/, 2 pages.
"Unified Cloud Interface Project", Reuven Cohen, Google Code Archive, Unifiedcloud, Reprinted from the Internet https://code.google.com/archive/p/unifiedcloud/, 2 pgs.
"What is a CDN & Where Does it Shine?", What is a CDN? Content Delivery Networks Explained—CDNetworks, 2022 Reprinted from the Internet at: https://www.cdnetworks.com/what-is-a-cdn/#:-:text=What%20ls%20A%20CDN%20%26%20Where,to%20users%20with%20minimal%20delay, 8 pages.
What is a Content Deliver Network on Azure?, Apr. 2022, Azure/Micrsoft Does, Azure Networking CDN, Reprinted from the Internet at: https://does.microsoft.com/en-us/azure/cdn/cdn-overview, 5 pgs.
What is a Content Delivery Network (CDN)?, May 2019, YouTube, IBM Technology, Reprinted from the Internet at: https://www.youtube.com/watch?v=Bsq5eKkS33l, 4 pages.
Zhang Z., et al., "PFC: Transparent Optimization of Existing Prefetching Strategies for Multi-level Storage Systems," 2008, 12 Pages.

ASYNCHRONOUS REGION-AWARE PREFETCHING AND CACHING

RELATED APPLICATIONS

This application claims priority to and is a continuation of U.S. Patent Application, titled "ASYNCHRONOUS REGION-AWARE PREFETCHING AND CACHING", filed on Aug. 22, 2022 and accorded U.S. patent application Ser. No. 17/892,451, which is incorporated herein by reference.

TECHNICAL FIELD

Various embodiments of the present technology generally relate to asynchronous region-aware prefetching and caching. More specifically, some embodiments relate to methods and systems for asynchronous region-aware prefetching and caching of snapshots for performing snapshot restore operations.

BACKGROUND

Developers have historically built applications to be run on a single platform. In some embodiments, an application may be hosted on a server (e.g., an on-premises server, a cloud-based server, etc.), and the application may utilize memory, storage, and processor resources of the server. However, building and deploying these types of applications is no longer desirable in many instances because modern applications often need to efficiently and securely distribute data (potentially across multiple platforms) based on demand. There are many options for developing scalable, modern applications to distribute data. Examples include, but are not limited to, virtual machines, microservices, and containers. The choice often depends on a variety of factors, such as the type of workload, available resources, need for automated scaling, need for data distribution, execution preferences, etc.

When developers select a containerized approach for creating scalable and/or distributed applications, portions of the application may be packaged into containers. Each container may comprise software code, binaries, system libraries, dependencies, system tools, and/or any other components or settings needed to execute the application. In this way, the container is a self-contained execution enclosure for executing that portion of the application.

Unlike virtual machines, containers do not include operating system images. Instead, containers ride on a host operating system, which is often light weight, thereby allowing for faster boot and lower memory consumption than a virtual machine. The containers can be individually replicated and/or scaled to accommodate demand. Management of the container (e.g., scaling, deployment, upgrading, health monitoring, etc.) is often automated by a container orchestration platform (e.g., Kubernetes).

The container orchestration platform can deploy containers on nodes (e.g., a virtual machine, physical hardware, etc.) that have allocated compute resources (e.g., processor, memory, etc.) for executing applications hosted within the containers. Applications (or processes) hosted within multiple containers may interact with one another and cooperate together. In some embodiments, a storage application within a container may access other applications within other containers to manage data by the storage application. Container orchestration platforms often offer the ability to support these cooperating applications (or processes) as a grouping (e.g., in Kubernetes this is referred to as a pod). This grouping (e.g., a pod) can support multiple containers and form a cohesive unit of service for the applications (or services) hosted within the containers.

Containers that are part of a pod may be co-located and scheduled on a same node, such as the same physical hardware or virtual machine. Co-located containers may share resources and dependencies with relatively low latency. Containers that are part of a pod may also interact with other distributed containers that are not co-located (e.g., located on different nodes of the distributed file system). Distributed containers may be hosted on nodes located within an edge region of a cloud computing environment that may reduce communication latency with client devices in the same edge region. The edge region may correspond to a network edge that may be an area where devices and/or local networks (e.g., a local area network (LAN)) interface with the internet or other type of network through equipment located in that area. The edge region (network edge) may be an entry point for accessing the internet or other type of network. The edge region (network edge) may consistent of various types of edge computing, such as a device edge, a sensor edge, a mobile edge, a wireless access edge, a router edge, a service provider edge, an Internet of Things (IoT) edge, etc. The edge region (network edge) may include communication network equipment (e.g., routers, 5G wireless communication equipment, 4G LTE wireless communication equipment, WiFi access points, switches, computers, etc.) to which devices can connect for communicating over the Internet or other type of network.

The nodes of the cloud computing environment may store data within cloud-based storage, host applications, and access services of the cloud computing environment. The cloud computing environment may comprise a cluster of nodes that provide storage services for users. In some embodiments, a volume may be mounted by a node for network file system (NFS) access by client devices. Another node may host a storage virtual machine, which may be configured to provide storage services for data stored within the volume. When a client device stores data within the cloud-based storage, a user operating the client device may have an expectation that there is some level of data protection for resources hosted within the cloud-based storage and/or an expectation that such resources are available to the client device with low latency. Unfortunately, the resources associated with the storage services (e.g., a volume by a node for NFS access) may not be provided near an edge region of a cloud computing environment, which may introduce latency. Performing a backup of these types of resources is also difficult because these resources may be dynamic and interlaced with dependencies, such as when the storage virtual machine depends upon a security policy resource. Additionally, data within these resources could become lost, corrupt, and/or unrecoverable because there is no backup near the edge region of a cloud computing environment.

SUMMARY

Various embodiments of the present technology relate to methods and systems for asynchronous region-aware prefetching and caching for performing operations near an edge region of a cloud computing environment. In particular, data stored within a first region may be asynchronously prefetched from the first region (e.g., a snapshot is retrieved from the first region before being requested). The data is cached within a second region so that the data is readily available to an application hosted in the second region (e.g., the application can quickly perform a restore operation using the snapshot).

Various embodiments of the present technology also relate to backup and restore of resources located within a cloud-based storage (e.g., a third-party cloud hyperscaler) for access near the edge region of a cloud computing environment. In some embodiments, a method executed by a data processing system is provided. As part of the method, a container orchestration platform spans across multiple regions of a multi-cloud environment. A first application within a first container of the container orchestration platform is hosted at a first region of the multi-cloud environment. A second application within a second container of the container orchestration platform is hosted at a second region of the multi-cloud environment. Data of the first application is stored within storage located within the first region of the multi-cloud environment. In response to determining that the second application has a threshold probability of accessing the data of the first application (e.g., the second application historically accessing data of the first application; the second application previously performing a restore operation using a snapshot created by the first application; the second application being configured as a failover partner for the first application; the second application being configured as a replica of the first application; etc.), the data is cached as cached data within a network edge of the second region for access by the second application.

In some embodiments of the method, the data is stored within a first storage bucket in the first region of the multi-cloud environment and a cross-region replication operation is performed to replicate the data from the first storage bucket to a second storage bucket as the cached data in the second region of the multi-cloud environment. Containers within the first region and the second region are provisioned with shared access to the data through the first storage bucket and the second storage bucket.

In some embodiments of the method, the storage in the first region of the multi-cloud environment is partitioned to create a first partition and a second partition, wherein the data is stored in the first partition of the storage. A third application is hosted within a third container of the container orchestration platform, wherein the third application is hosted at the first region of the multi-cloud environment. The third application performs a cloning operation to clone the data from the first partition to the second partition as cloned data. In some embodiments of the method, the cloned data is cached as the cached data within the network edge of the second region for access by the second application.

In some embodiments of the method, the first application is registered with a lifecycle management application, wherein the lifecycle management application is configured to instruct the third application to perform the cloning operation of the data. The lifecycle management application, after registering the first application with the lifecycle management application, instructs the third application to perform the cloning operation. In some embodiments of the method, a unified cloud user interface is constructed for accessing the data by client devices within multiple regions of the multi-cloud environment. The unified cloud user interface is populated with information identifying content and cached content stored across the multiple regions of the multi-cloud environment. The information identifying the content is associated with the data within the storage located within the first region of the multi-cloud environment and the information identifying the cached content is associated with the cached data within the network edge of the second region.

In some embodiments of the method, the unified cloud user interface provides, to a client device of the first region of the multi-cloud environment, the information identifying the content associated with the data within the storage located within the first region of the multi-cloud environment and the information identifying the cached content associated with the cached data within the network edge of the second region.

In some embodiments of the method, a first client device in the first region of the multi-cloud environment and a second client device in the second region of the multi-cloud environment is authenticated with the first application within the first container of the container orchestration platform, and access to the first container is shared with the first client device and the second client device based upon the authentication.

In some embodiments of the method, determining that the second application has the threshold probability of accessing the data of the first application is based upon an indication that the data is a snapshot that is accessible for the second application to restore for a client device of the second region of the multi-cloud environment. In some embodiments of the method, the cached data is accessed by the second application to perform a restore of the cached data to the client device based upon the indication.

In some embodiments of the method, a trained machine learning model receives content metadata associated with content and cached content metadata associated with cached content stored across the multiple regions of the multi-cloud environment. The content metadata is associated with the data within the storage located within the first region of the multi-cloud environment and the cached content metadata is associated with the cached data within the network edge of the second region. A lifecycle management application receives predictions from the trained machine learning model indicating a probability of accessing the data of the first application by a client device based upon the content metadata. The lifecycle management application determines that the second application has the threshold probability of accessing the data of the first application based upon the predictions.

In some embodiments of the method, a machine learning model is trained with historical content metadata associated with historical content and historical cached content metadata associated with historical cached content stored across the multiple regions of the multi-cloud environment, wherein the historical content metadata is associated with historical data within the storage located within the first region of the multi-cloud environment and the historical cached content metadata is associated with historical cached data within the network edge of the second region.

In some embodiments of the method, an electronic action is generated by the lifecycle management application for delivery to the client device indicating that the second application has the threshold probability of accessing the data of the first application based upon the predictions. A response to the electronic action is received by the lifecycle management application to access the cached data by the second application to perform a restore of the cached data to the client device based upon the response to the electronic action. In some embodiments of the method, the content metadata received by the trained machine learning model is received from the client device.

In some embodiments, a system is provided. The system comprises a first storage is configured to be accessed by a first application hosted by a first container through a container orchestration platform spanning across multiple regions of a multi-cloud environment, wherein the first application is hosted at a first region of the multi-cloud environment. The system comprises a second storage is configured to be accessed by a second application hosted by a second container of the container orchestration platform, wherein the second application is hosted at a second region of the multi-cloud environment. The system comprises a storage management system configured to store, within the first storage, data of the first application and metadata associated with the data. The storage management system is configured to receive predictions, from a trained machine learning model and based on the metadata, indicating that the second application has a threshold probability of accessing the data of the first application. The storage management system is configured to cache, in response to the predictions, the data as cached data within a network edge of the second region for access by the second application.

In some embodiments, the system comprises the storage management system configured to store the data within a first storage bucket in the first region of the multi-cloud environment. The storage management system is configured to perform a cross-region replication operation to replicate the data from the first storage bucket to a second storage bucket as the cached data in the second region of the multi-cloud environment. The storage management system is configured to provision containers within the first region and the second region with shared access to the data through the first storage bucket and the second storage bucket.

In some embodiments, the system comprises the storage management system configured to construct a unified cloud user interface for accessing the data by client devices within multiple regions of the multi-cloud environment. The storage management system is configured to populate the unified cloud user interface with information identifying content and cached content stored across the multiple regions of the multi-cloud environment, wherein the information identifying the content is associated with the data within the first storage located within the first region of the multi-cloud environment and the information identifying the cached content is associated with the cached data within the network edge of the second region.

In some embodiments, the system comprises the storage management system configured to authenticate a first client device in the first region of the multi-cloud environment and a second client device in the second region of the multi-cloud environment with the first application hosted by the first container of the container orchestration platform. The storage management system is configured to share access to the first container with the first client device and the second client device based upon the authentication.

In some embodiments, a non-transitory machine-readable medium is provided. The non-transitory machine-readable medium comprises instructions that cause a machine to host a first application within a first container of a container orchestration platform spanning across multiple regions of a multi-cloud environment, wherein the first application is hosted at a first region of the multi-cloud environment. The instructions cause the machine to host a second application within a second container of the container orchestration platform at a second region of the multi-cloud environment. The instructions cause the machine to store data of the first application within first storage located within the first region of the multi-cloud environment. The instructions cause the machine to cache the data within a network edge of the second region for access by the second application in response to predictions from metadata associated with access to the first application by a client device, wherein the predictions indicate that the second application has a threshold probability of accessing the data.

In some embodiments, the instructions cause the machine to determine that the second application has the threshold probability of accessing the data of the first application based upon an indication that the data is a snapshot that is accessible by the second application to perform a restore for the client device in the second region of the multi-cloud environment.

DESCRIPTION OF THE DRAWINGS

Embodiments of the present technology will be described and explained through the use of the accompanying drawings in which.

Figure 1A:
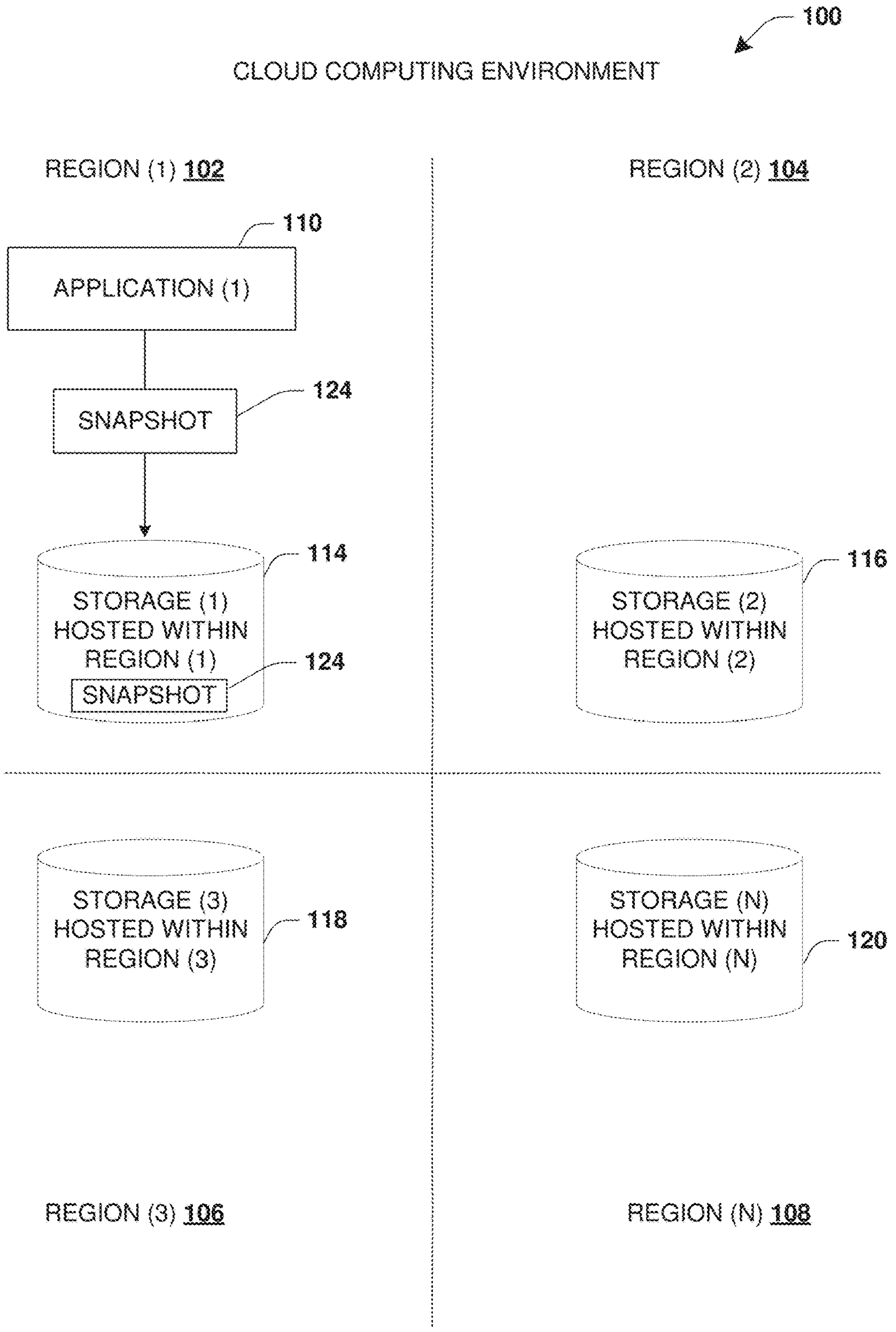
FIG. 1A is a block diagram illustrating an example of a first application storing data within a first region of a cloud computing environment in accordance with various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The techniques described herein are directed to implementing asynchronous region-aware prefetching and caching. Historically, computing systems would typically store client data within local storage of a client computing device or within network attached storage (e.g., storage provided by a server according to a client/server model) that is attached to the same network to which the client is connected. For example, a phone would store photos within local storage of the phone, a laptop would store files within local storage of the laptop, employee computers would store files within storage of servers attached to a corporate network, etc. With the increase of globalized companies (e.g., employees in different states or countries collaborating on the same project), travel, and cloud storage environments, there is an expectation that clients can store data that can then be accessed from any location, device, and network. For example, a client can upload photos from the phone to cloud storage, and then access those photos from any other device or location. With certain types of computing environments (e.g., a cloud computing environment), data of applications may be stored within particular locational regions where the applications are hosted so that content may be delivered quickly to the applications. For example, if an application is running in a US Western region, then data of the application may be stored within storage that is also located at the US Western region, as opposed to another region (e.g., US Eastern region). Reducing the physical distance between a location where the application is running and a location where the data of the application is stored reduces latency for the application to access the data due to reduced network hops, a shorter data transmission route, etc.

Unfortunately, if the location of the device changes (e.g., a user with a laptop whose data is stored within the US Western region travels to the US Eastern region or even a different country or continent) or a different device in a different region requests access to the data, then there could be unacceptably high latency when accessing the data. For example, a file service running in the US Eastern region may generate a snapshot (e.g., a backup of files hosted by the file service) that is stored within storage of the US Eastern region. An application running in the US Western region may request access to perform a restore operation using the snapshot. As part of performing the restore operation, cross region replication/cloning must be performed to replicate the snapshot into storage of the US Western region accessible to the application, which can take a significant amount of time, thus making the restore operation very slow. These issues were previously not a problem with prior storage systems that used a client/server model concept where a client device could restore data directly from a server that may be attached to the same network as the client device. However, this is now an issue because the cloud computing environment may be region specific as to where data is stored, and thus the application in the US Western region cannot directly restore the snapshot stored in the US Eastern region.

The techniques described herein are directed to asynchronous region-aware prefetching and caching for a cloud computing environment (e.g., a multi-cloud environment, a content delivery network composed of a geographically distributed group of servers which work together to provide fast delivery of Internet content, a single cloud environment divided into multiple geographical regions, etc.) used to improve read performance of applications accessing data stored within the cloud computing environment. In some embodiments, a snapshot is asynchronously prefetched (e.g., retrieved before being requested) from a first region and is cached within a second region for faster access by an application hosted within the second region. The snapshot is asynchronous prefetched before the snapshot is requested so that the snapshot is readily available for faster access when requested. In this way, the snapshot is asynchronously prefetched, as opposed to being synchronously fetched in sync with a request (e.g., as part of processing the request) for access to the snapshot otherwise resulting in a delay from when the request is issued and when the snapshot will be available.

Caching the snapshot within the second region where the application is hosted allows the application to more quickly perform a restore operation using the snapshot in order to meet certain restore time constraints and requirements (e.g., a service level agreement may specify that a restore by the application for a client must be completed within a certain timeframe). The techniques may identify content that will be used by an application executing in a particular region of the cloud computing environment. Content may then be cached at a network edge of the region of the cloud computing environment where the application is executing. Latency and time for the application to access the content may be reduced.

As an example, a first application in a first region (e.g., the US Eastern region) may create data, such as a snapshot. The snapshot may be stored within the first region so that the snapshot data may be stored relatively close to where the first application is hosted, permitting quick access. The first application may have a correlation with a second application (e.g., metadata, security information, or other information may indicate that the applications are allowed to share data, are part of a same tenancy of a multi-tenant environment, are part of the same backup/restore software suite, etc.). For example, the first application and the second application may be different instances of the same backup/restore application. In another example, the second application may be a partner of the first application, such as where the second application can takeover processing of data and client I/O in the event of failure of the first application. In this example, the applications may have a partnership relationship with one another. In another example, the first application may generate a snapshot of a volume as part of backup functionality implemented by the first application on behalf of a first client device. This snapshot may be stored within storage of the first region. A second client device may have permission to restore the volume at a second region by using the second application to perform a restore operation using the snapshot. Thus, the second region may be identified for caching the snapshot for faster access by the second application. Such correlation and/or other factors (e.g., the second application historically accessing or communicating with the first application, a configuration setting specifying that the second application has access to the snapshot, etc.) may be used to determine that the second application may subsequently access the snapshot.

The second application may be in a second region (e.g., US Western region) different than the first region of the first application and/or the location of the snapshot. Accordingly, techniques described herein may determine that the second application could potentially access the snapshot at a subsequent point in time and that the second application is hosted remote to the first application. In this example, a relatively long time for the second application to access the snapshot may be encountered because the snapshot is stored far from the second application. Retrieving the snapshot may involve multiple network hops and/or other network latency issues. Additionally, the snapshot may not be directly retrieved by the second application, but a cumbersome and time-consuming cross region replication/cloning operation may need to be performed in order to replicate the snapshot to storage within the second region (e.g., such that the second application can access the replicated snapshot). In other words, an application may be limited to direct access of data stored within the region where the application is located and cannot directly access the data stored in other regions due, in some embodiments, to region specific limitations of the multi-cloud environment.

In order to improve access time of the second application to access the snapshot, techniques described herein may provide that the cloud computing environment preemptively caches the snapshot within the second region, such as at a network edge (a network edge server), of the cloud computing environment in the second region. Preemptively caching the snapshot closer to the second application before the second application attempts or requests access to the snapshot may greatly increase performance of operations that the second application performs upon the snapshot, such as a restore operation.

In summary, techniques described herein are capable of evaluating how a cloud environment spanning multiple regions has deployed storage in order to identify a closest geographical region to where backup data will subsequently be used. Thus, when data protection functionality creates a backup data within a particular region of the cloud environment, the backup data can be cached within another region (at a network edge server of this other region) that is geographically closest to where the backup data may be subsequently used, such as by a different application. This reduces latency that applications may experience when accessing data spanning multiple regions within the cloud. Otherwise, without this innovation, the cloud environment may be very region specific, and data may be maintained within the same region where the data was originally generated, and/or the data may not move to other regions.

Various embodiments of the present technology provide for a wide range of technical effects, advantages, and/or improvements to computing systems and components. In some embodiments, various embodiments may include one or more of the following technical effects, advantages, and/or improvements: 1) implementation of techniques for determining that a second application in a second region has a threshold probability of accessing data of a first application in a first region; 2) delivering high performant content across multiple geographic regions by automatically prefetching and caching content for improved performance without manual intervention (e.g., prefetching a snapshot from a first region before being requested and caching the snapshot within a second region so that an application in the second region can more quickly perform a restore operation using the snapshot); 3) use of non-routine and unconventional operations to preemptively partition storage in a first region of a multi-cloud environment to create a first partition and a second partition in preparation of a cloning operation; 4) use of non-routine and unconventional operations to preemptively clone data from the first partition to the second partition, and then cache the cloned data as cached data within a network edge to improve performance of data retrieval operations (e.g., backup and restore operations of the data); 5) use of non-routine and unconventional operations to populate a unified cloud user interface with information identifying content and cached content stored across the multiple regions of a multi-cloud environment to improve the efficiency of data retrieval; 6) preemptively authenticating a first client device in a first region of the multi-cloud environment and a second client device in a second region of the multi-cloud environment to improve efficiency of access to a shared container; 7) use of non-routine and unconventional operations to receive predictions from a trained machine learning model indicating a probability of accessing the data, based upon metadata associated with content that is associated with the data, to preemptively cache data within a network edge (e.g., to improve performance of data retrieval operations); and/or 8) use of non-routine and unconventional operations to generate an electronic action for delivery to a client device indicating that a second application has a threshold probability of accessing data of a first application, to prompt the client device to initiate caching of data and/or content within a network edge (e.g., to improve performance of data retrieval operations), etc.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a distributed storage architecture and container orchestration platform (e.g., Kubernetes), embodiments of the present technology are equally applicable to various other computing environments such as, but not limited to, a virtual machine (e.g., a virtual machine hosted by a computing device with persistent storage, such as non-volatile random-access memory (NVRAM), accessible to the virtual machine for storing a persistent key-value store), a server, a node, a cluster of nodes, etc.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a computer-readable medium or machine readable-medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to various embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1A is a block diagram illustrating an example of a first application 110 storing data within a first region 102 of a cloud computing environment 100 in accordance with various embodiments of the present technology. The cloud computing environment 100 may be comprised of storage devices, servers, network equipment (e.g., routers, WiFi access points, cellular access pointers, etc.), nodes, and/or other devices that may be distributed across multiple different regions (e.g., the first region 102, a second region 104, a third region 106, an Nth region 108, etc.). The different regions may correspond to different cities, states, countries, continents, geographical regions, or other partitions of the cloud computing environment 100. Each region may have local storage hosted within that region. The first region 102 includes first storage 114, the second region 104 includes second storage 116, the third region 106 includes third storage 118, the Nth region 108 includes Nth storage 120, etc. Data of an application located within a particular region may be stored within the storage in that same region so that the application can store and access the data more quickly and with lower latency than if the data was stored within storage of a different region further from the application. In some embodiments, a first application 110 hosted within a device currently located within the first region 102 may generate a snapshot 124 that is stored within the first storage 114 in the first region 102. In this way, the first application 110 can quickly access the snapshot 124 within the first storage 114 in the first region 102.

Figure 1B:
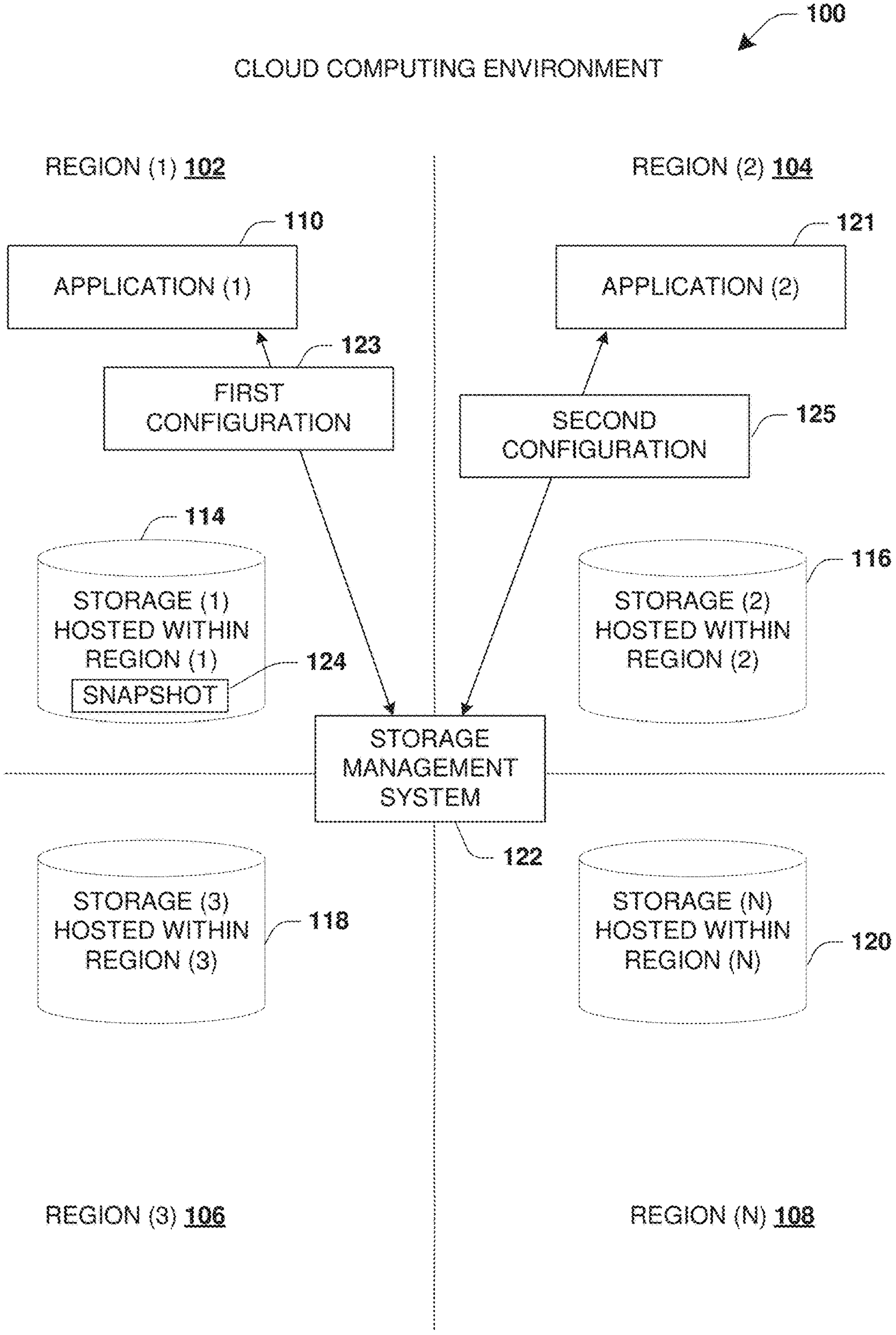
FIG. 1B is a block diagram illustrating an example of determining whether a second application will subsequently request data generated by a first application in accordance with various embodiments of the present technology.

FIG. 1B is a block diagram illustrating an example of determining whether a second application 121 will subsequently request data generated by the first application 110 in accordance with various embodiments of the present technology. A storage management system 122 may be configured to predict whether the second application 121, hosted within the second region 104, will access data (e.g., the snapshot 124 stored within the first storage 114 of the first region 102) generated by the first application 110. In some embodiments, the storage management system 122 may implemented as a storage service hosted within one or more regions of the cloud computing environment.

1 In some embodiments of predicting whether the second application 121 will access the snapshot 124 generated by the first application 110, the storage management system 122 accesses a first configuration 123 of the first application 110 and/or a second configuration 125 of the second application 121. The configurations may be retrieved from computing environments within which the applications are hosted, such as from metadata maintained by container orchestration platforms hosting containers within which the applications are executing. The storage management system 122 may evaluate the first configuration 123 and/or the second configuration 125 to generate a prediction as to whether the second application 121 will access the snapshot 124 generated by the first application 110. The prediction may be based upon various conditions that may relate to whether the applications have a replica relationship (e.g., data is replicated/mirrored between the applications), a backup and restore relationship, a failover relationship (e.g., the second application 121 is to takeover for the first application 110 if the first application 110 has failed), are owned or accessed by the same client/tenant, have previously shared data, are the same type of application, are capable of opening/accessing the same types of data or files, have historically communicated with one another, etc. Various weights, conditions, prediction mechanisms, and/or machine learning models/algorithms may be used to generate the prediction, which are further described in relation to FIGS. 2-6B.

Figure 1C:
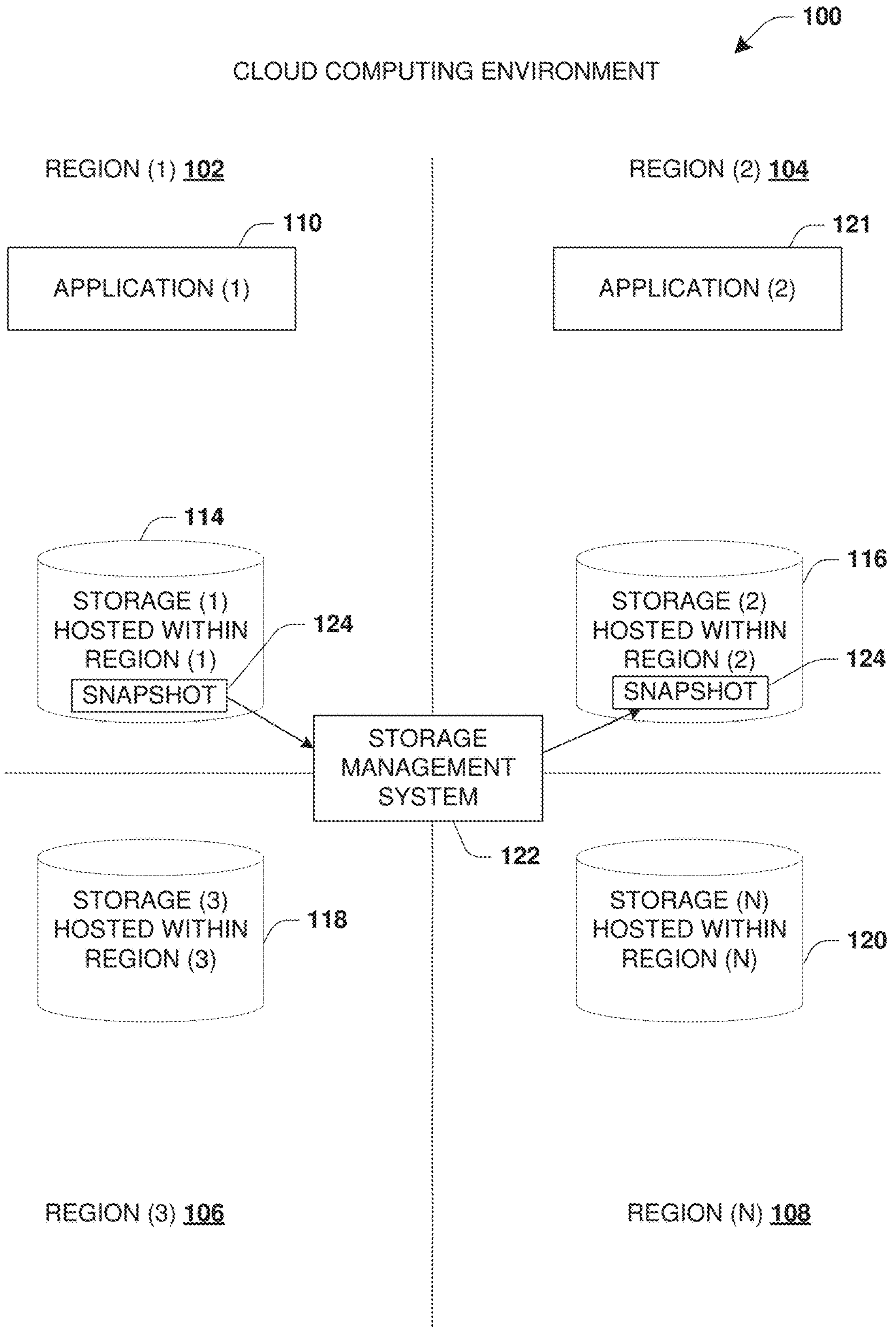
FIG. 1C is a block diagram illustrating an example of implementing asynchronous region-aware prefetching and caching in accordance with various embodiments of the present technology.

If the storage management system 122 predicts that the second application 121 will subsequently access the snapshot 124 (e.g., a predicted likelihood of 80% or more that the second application 121 will subsequently perform a restore operation using the snapshot 124), the storage management system 122 prefetches the snapshot 124 from the first storage 114 and caches the snapshot 124 in the second storage, as illustrated by FIG. 1C depicting a block diagram illustrating an example of implementing asynchronous region-aware prefetching and caching in accordance with various embodiments of the present technology. The storage management system 122 asynchronously prefetches and caches the snapshot 124 in an asynchronous manner as opposed to in a synchronous manner as part of processing a request by the second application 121 for the snapshot 124, which would result in the second application 121 waiting until the snapshot 124 has been transferred to the second storage 116. This may be because the second application 121 is unable to directly access the snapshot 124 while the snapshot 124 is stored within the first storage 114 in the first region 102 because the second application 121 is in the second region 104, and thus must wait for the snapshot 124 to be transferred to the second storage 116. In this way, the snapshot 124 may be asynchronously prefetched and cached before being requested by the second application 121 so that the snapshot 124 is already cached within the second storage 116 of the second region 104 accessible to the second application 121 when the second application 121 subsequently requests access to the snapshot 124. This also enables dynamic caching that can be performed any time in response to changing conditions, such as where an initial prediction indicates that the second application 121 will not access the snapshot 124, and then a subsequent prediction does indicate that the second application 121 will likely access the snapshot 124 (e.g., the second application 121 has recently accessed other data generated by the first application 110; the second application 121 has recently taken over processing for the first application 110 based upon the first application 110 failing; a backup and restore relationship was recently created between the applications; etc.), and thus the snapshot 124 is dynamically cached within the second storage 116.

Figure 1D:
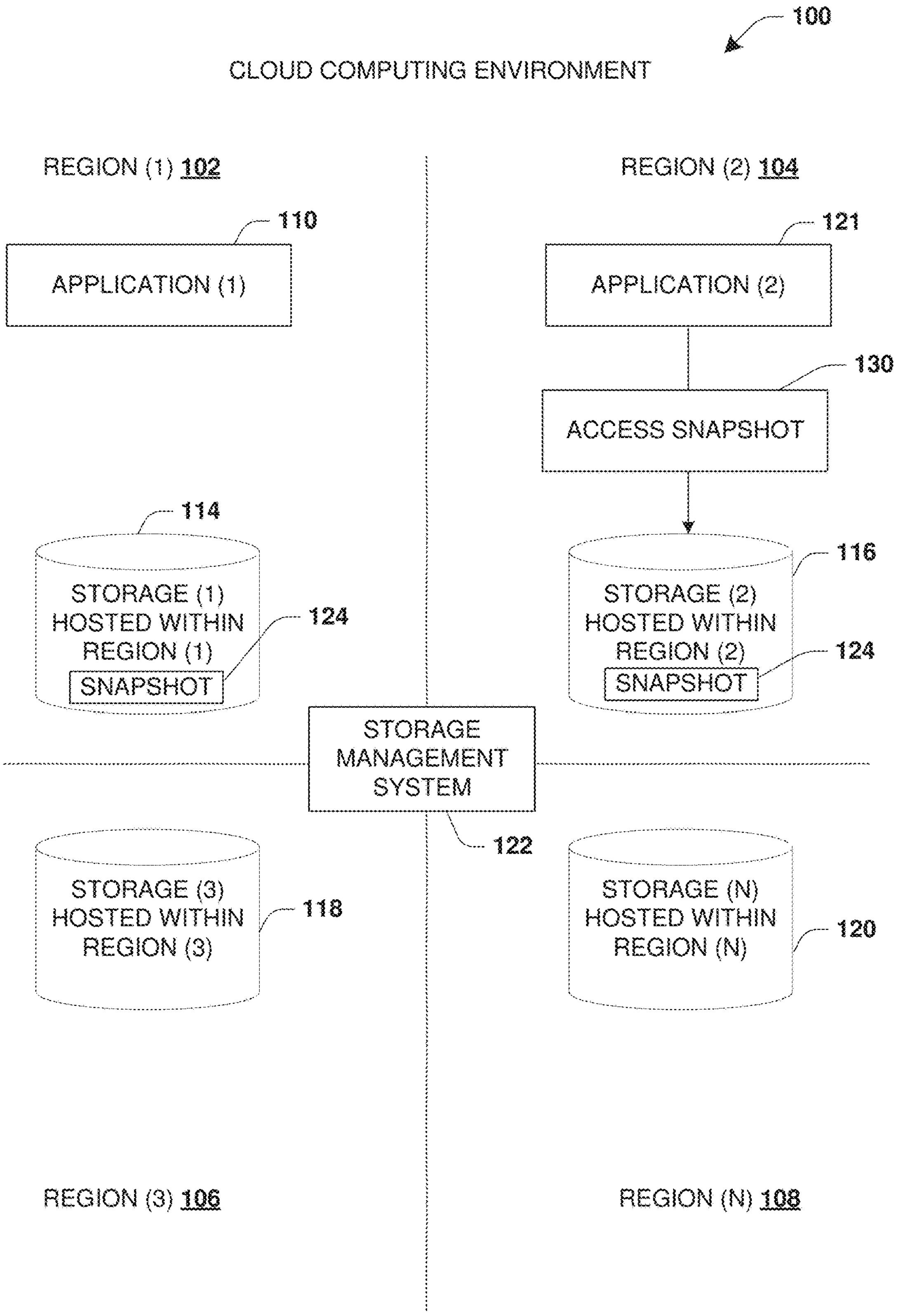
FIG. 1D is a block diagram illustrating an example of providing a second application with access to cached data in accordance with various embodiments of the present technology.

FIG. 1D is a block diagram illustrating an example of providing the second application 121 with access to cached data in accordance with various embodiments of the present technology. After the snapshot 124 has been cached within the second storage 116 of the second region 104, the second application 121 may access 130 the snapshot 124 within the second storage 116 (e.g., restore a volume backed up by the snapshot 124). The second application 121 can access the snapshot 124 much faster than if the second application 121 had to either wait for the snapshot 124 to be transferred to the second storage 116 in response to a request to access the snapshot 124 (e.g., where the second application 121 only has direct access to the second storage 116 and not the first storage 114) or had to access the snapshot 124 from the first storage 114 in the first region 102 further from the second application 121.

Figure 2:
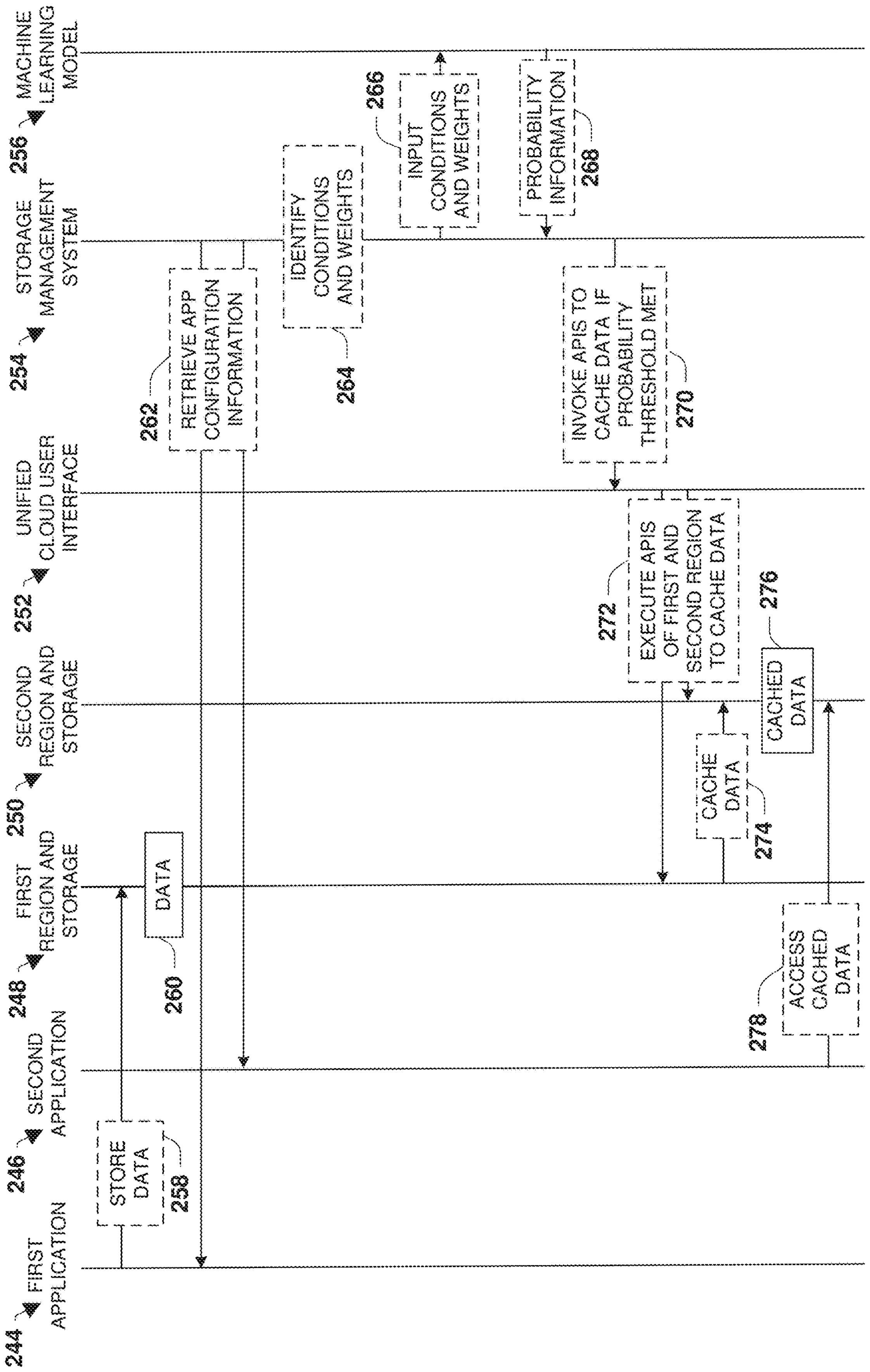
FIG. 2 is a sequence diagram illustrating an example of a set of operations used to determine whether to cache data from a first region to a second region in accordance with various embodiments of the present technology.

FIG. 2 is a sequence diagram illustrating an example of a set of operations used to determine whether to cache data from a first region to a second region in accordance with various embodiments of the present technology. A first application 244 may store 258 data 260 within a first region 248 of a cloud environment. In some embodiments, the first application 244 may directly transmit and/or store the data 260 to the first region 248. In some embodiments, the first application 244 may utilize a unified cloud user interface 252 to access the first region 248 in order to invoke an API of the first region 248 through the unified cloud user interface 252 in order to store 258 the data 260 within the first region 248. In some embodiments, the first application 244 may be hosted within the first region 248 (e.g., a west coast region), and thus the data 260 is stored within the first region 248 so that the first application 244 is relatively close to the data 260 compared to if the data 260 was stored in a different region. In this way, the first application 244 can more quickly access the data 260 generated by the first application 244. In some embodiments, the data 260 may be a snapshot generated by the first application 244, such as a snapshot of a volume through which the first application 244 provides clients with access to client data. The first application 244 may be associated with a first configuration, such as metadata, a manifest file, a container image (e.g., an image used to host a container within which the first application 244 is executing), etc. A second application 246 may be hosted within a second region 250 (e.g., an east coast region), and may be associated with a second configuration.

A storage management system 254 may be configured to retrieve 262 the first configuration of the first application 244 and/or the second configuration of the second application 246. The configurations may be retrieved from computing environments within which the applications are hosted, such as from metadata maintained by container orchestration platforms hosting containers within which the applications are executing. The storage management system 254 may evaluate the first configuration and/or the second configuration to identify 264 conditions and/or weights associated with the conditions. These conditions may relate to whether the applications have a replica relationship, a backup and restore relationship, a failover relationship, are owned or accessed by the same client, have previously accessed or shared data, are the same type of application, are capable of opening/accessing the same types of data or files, have historically communicated with one another, etc. The weights may be optionally identified and assigned to conditions based upon how determinative the conditions are with respective to determining whether the second application 246 will or will not access the data 260 generated by the first application 244.

The storage management system 254 may input 266 the conditions and/or the weights into a machine learning model 256 that is configured to take the conditions and/or weights as input and output 268 probability information. The probability information may relate to a percentage probability prediction by the machine learning model 256 that the second application 246 will access the data 260 (e.g., a 72% probability that the second application 246 will request access to the data 260). In this way, the machine learning model 256 may output 268 the probability information to the storage management system 254. The storage management system 254 may compare the probability information with a probability threshold (e.g., a 25% probability threshold). The probability threshold may be determined based upon a cost benefit analysis of a cost to cache the data 260 within the second region 250 (e.g., bandwidth utilization, storage costs charged by a storage provider of the second region 250, an amount of data being transferred and cached within the second region 250, etc.) compared to the benefit of the second application 246 having faster access to the cached data 276 because the cached data 276 would be cached in the second region 250 where the second application 246 also located. The benefit may relate to criticality and timing requirements (e.g., specified through service level agreements, service level objectives, recovery time objectives, etc.) for the second application 246 being able to access the data 260. In some embodiments, the second application 246 may be a failover partner for the first application 244 that is configured to provide clients with failover access to business critical data in place of the first application 244 if the first application 244 fails. Thus, being able to provide the clients with fast failover access to the business critical data may be indicative of a large benefit for the cost benefit analysis. The benefit may take into account how much quicker the second application 246 can access the cached data 276 compared to accessing the data 260 within the first region. A ratio of the cost to cache the data (e.g., a cost to transfer and store a duplicate copy of the data in the second region 250) to the benefit of caching the data (e.g., a benefit corresponding to an improved ability and likelihood of the second application 246 being able to satisfy a failure recovery requirement specified by a service level agreement for a client that would be provided with failover access by the second application 246 to the cached data 276) may be determined. The ratio may be taken into account when determining whether to cache the data 260 within the second region 250.

In response to the storage management system 254 determining that the probability information indicates that the probability threshold is met and/or that the ratio of the cost benefit analysis indicates that the benefit is greater than the cost, the storage management system 254 caches 274 the data 260 within the second region 250. The storage management system 254 either directly accesses the first region 248 and the second region 250 in order to cache 274 the data 260 from the first region 248 to the second region 250 as cached data 276 or utilizes the unified cloud user interface 252 to invoke 270 APIs of the first region 248 and the second region 250 for copying and caching the data 260 from the first region 248 to the second region 250 as the cached data 276. The unified cloud user interface 252 may provide a single access point to clients, the first application 244, the second application 246, and/or the storage management system 254 to access APIs of cloud providers hosting the first region 248 and the second region 250. The APIs may be execute 272 by the storage management system 254 through the unified cloud user interface 252 to read the data 260 from the first region 248 using an API of a cloud provider hosting the first region 248 and to cache 274 the data 260 in the second region 250 using an API of a cloud provider hosting the second region 250. In this way, the second application 246 hosted within the second region 250 can more quickly access 278 the cached data 276 in the second region 250 than if the second application 246 accessed the data 260 in the first region 248.

Figure 3:
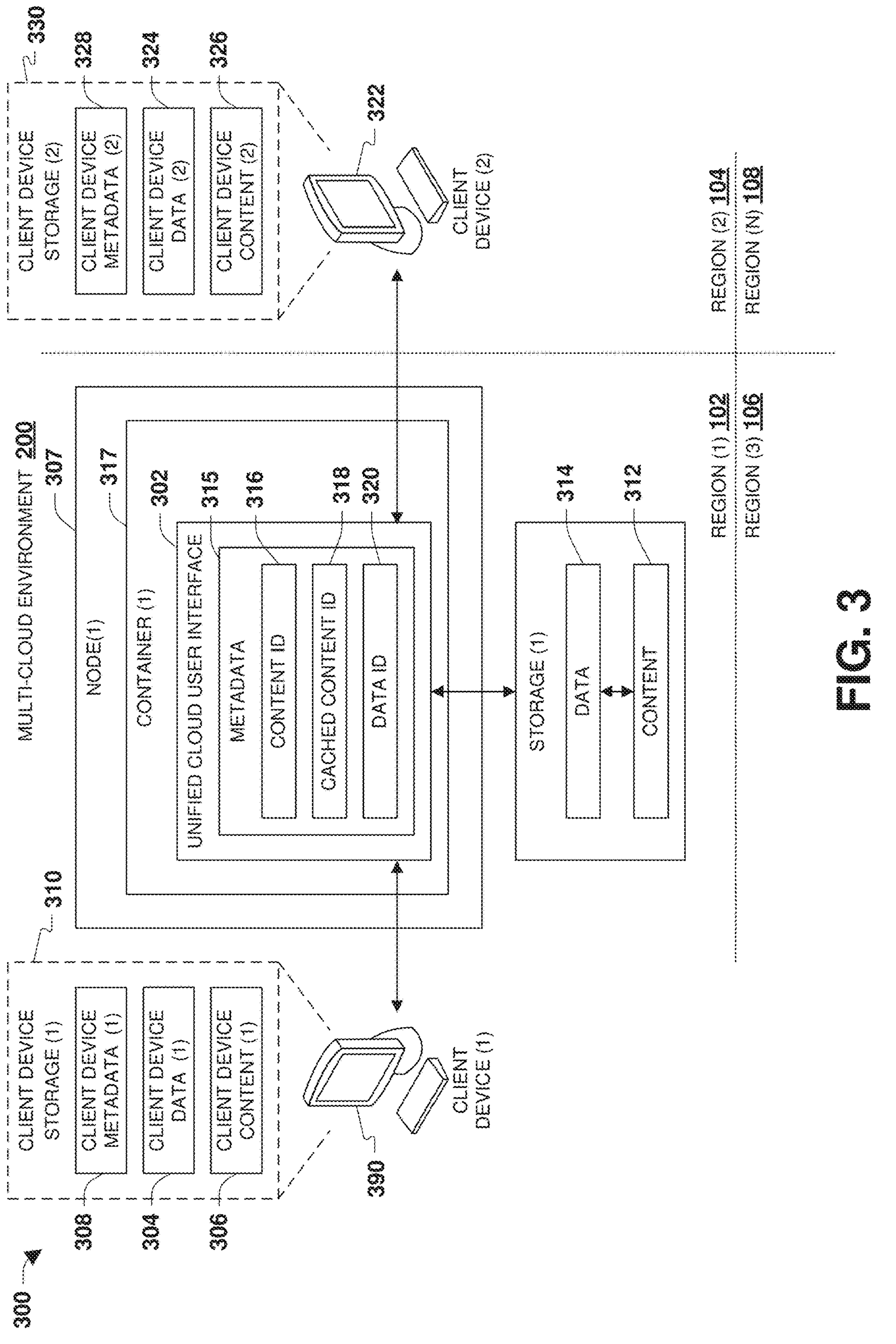
FIG. 3 is a block diagram illustrating an example of a distributed storage architecture in accordance with various embodiments of the present technology.

FIG. 3 is a block diagram illustrating an example of a distributed storage architecture 300 implementing the cloud environment in accordance with various embodiments of the present technology. In accordance with some embodiments, the first container 317 of the first node 307 may construct a unified cloud user interface 302 for accessing data by client devices within multiple regions of the cloud environment. The unified cloud user interface 302 may provide clients with a single access point and API through which the clients can access various cloud provider APIs hosted by the different regions and/or cloud providers of the cloud environment. That is, the unified cloud user interface 302 may be implemented as a common interface that can be used to access and interact with remote platforms, systems, networks, data, applications, and/or services that may be hosted across one or more cloud computing environments and/or regions of a cloud computing environment. The unified cloud user interface 302 may provide an interface through which clients can access various cloud application programming interfaces (APIs) in order to store and retrieve data, host applications, access services, etc. The unified cloud user interface may provide clients with a single access point for accessing a plurality of cloud APIs hosted by various cloud computing environments and cloud providers. In some embodiments, the unified cloud user interface 302 provides an application with access to locally cached data that was prefetched and cached within a region where the application is hosted.

When an application on a client device accesses data through the unified cloud user interface 302, various information regarding the access may be tracked. The tracked information may relate to an application type of the application, an access date/time, a type of access (e.g., read, write, backup, restore, etc.), an application identifier of an application that generated the data being accessed by the application, whether the application is performing a restore operation using the data (e.g., restoring a snapshot generated by a different application), a location of the application (e.g., the first region 102), a location of the data (e.g., the third region 106), a location of the application that generated the data (e.g., the third region 106), etc. In this way, a storage management system can track information obtained through the unified cloud user interface 302 that can be used to predict whether an application will access data generated by other applications so that the data can be prefetched and cached within storage of a region where the application is located. Once cached, the application can use the unified cloud user interface 302 to identify and access the data.

Without the unified cloud user interface 302, a client would have to separately access and understand how to invoke a plurality of different APIs of each region and/or cloud provider in order to access data, host applications, and/or utilize services and features that are separately hosted at each region or cloud provider. Each API may have its own requirements, format, and parameters that are to be passed to an API when calling/invoking the API. Instead of clients individually accessing each API, the unified cloud user interface 302 is configured with functionality that can interact with various different APIs of the different regions and cloud providers (e.g., the ability to perform API calls to API endpoints of the different regions and cloud providers in order to access data, applications, and/or services) on behalf of the clients. In this way, the clients can utilize the unified cloud user interface 302 as a single access point for discovering and interacting with APIs of different regions and cloud providers without specific knowledge or understanding of the APIs (e.g., what parameters and values to include within an API call to an API endpoint within a specific region of a particular cloud provider, such as a GET API call to retrieve data, a POST API call to store data, an API call to access functionality of a service, etc.).

In some embodiments, the unified cloud user interface 302 may receive from the first client device 390, client device data 304, client device content 306, and/or client device metadata 308. The client device metadata 308 may identify various parameters and/or attributes of the client device data 304 and/or the client device content 306. The client device data 304, the client device content 306, and/or client device metadata 308 may, in some embodiments, be stored in a client device storage 310 of the first client device.

In some embodiments, the unified cloud user interface 302 may communicate with one or more storage devices of the storage platform. The first container 317 may access the first storage to populate the unified cloud user interface 302 with content 312 and/or data 314 from the first storage. The unified cloud user interface 302 may receive metadata 315, which may include information identifying content, such as content ID 316, stored across the multiple regions of the cloud environment. The metadata 315 may include information identifying attributes of the data 314 and/or the content 312 within the first storage. The metadata 315 may include information identifying cached content, such as cached content ID 318 stored across the multiple regions of the cloud environment. In some embodiments, the content ID 316 identifies the content 312 stored in the first storage. In some embodiments, the content ID 316 identifies the client device content 306 of the first client device 390. In some embodiments, the content 312 stored in the first storage includes the client device content 306, portions of the client device content 306, backups of the client device content 306, and/or slices of the client device content 306. In some embodiments, the content 312 may be associated with the data 314 within the first storage, which may be located within the first region 102 of the cloud environment. In another example, the cached content ID 318 may identify cached content that is associated with cached data within another region of the cloud environment, such as the network edge of the second region 104.

In some embodiments, the unified cloud user interface 302 may provide, to the first client device 390 of the first region 102 of the cloud environment, the content ID 316, which may include information identifying the content 312 associated with the data 314 within the first storage located within the first region 102 of the cloud environment. In some embodiments, the unified cloud user interface 302 may provide, to the first client device 390 of the first region 102 of the cloud environment, the cached content ID 318, which may include information identifying the cached content associated with the cached data within the network edge of the second region 104. In some embodiments, the unified cloud user interface 302 may provide, to the first client device 390 of the first region 102 of the cloud environment, data ID 320, which may include information identifying the data 314 stored in the first storage. In some embodiments an application, such as a data management system within the first container 317, may compare the data ID 320 with the client device metadata 308 stored in the client device storage 310 to determine if a backup or restore of the client device data 304 should be performed to the first client device 390. In some embodiments, the first client device 390 may compare the data ID 320 with the client device metadata 308 stored in the client device storage 310 to determine if a backup or restore of the client device data 304 should be performed. Other arrangements and/or configurations for comparing the data ID 320 with the client device metadata 308 are within the scope of the present disclosure.

In some embodiments, the unified cloud user interface 302 may be constructed for accessing data by client devices within the second region 104 of the cloud environment. In some embodiments, the unified cloud user interface 302 may receive from a second client device 322, second client device data 324, second client device content 326, and second client device metadata 328. The second client device metadata 328 may identify various parameters and/or attributes of the second client device data 324 and/or the second client device content 326. The second client device data 324, the second client device content 326, and the second client device metadata 328 may, in some embodiments, be stored in a second client device storage 330 of the second client device 322.

In some embodiments, the unified cloud user interface 302 may authenticate the first client device 390 in the first region 102 of the cloud environment and may authenticate the second client device 322 in the second region 104 of the cloud environment with the same application. In some embodiments, the unified cloud user interface 302 may authenticate the first client device 390 with the first application within the first container 317 of the container orchestration platform. In this example, the unified cloud user interface 302 may authenticate the second client device 322 with the first application within the first container 317. Upon successful authentication, the unified cloud user interface 302 may share access to the first container 317 with the first client device 390 and the second client device 322. In accordance with the techniques as set forth above, multiple client devices across different regions of the cloud environment may cooperate on shared projects utilizing shared data.

In this way, the unified cloud user interface 302 provides client devices with access to cached content, such as snapshots and backup data. Because the cached content is cached at a network edge of a region where a requesting application is hosted (e.g., cached physically close to where the requesting application is hosted compared to where the content may otherwise be stored in a different region further away), the requesting application can more quickly access the data, such as to perform a restore operation using the snapshots and backup data. Latency associated with performing such operations by the requesting application is reduced because the data used to perform the operations is cached close to the requesting application, for faster access by the requesting application.

An example of an authentication operation may determine an MD5 checksum for data, applications, or log files on a client device. An MD5 checksum is a 32-character hexadecimal number that is computed on a file. If two files have the same MD5 checksum value, then there is a high probability that the two files are the same. In some embodiments, after downloading a software installation package, an MD5 checksum may be compared with the installation file to verify and/or authenticate the integrity of a download. In some embodiments, verification of a software license may be performed. In some embodiments, a license string for a third-party application may be compared with a license log file to determine if a software license is compliant. In another example, a timestamp may be monitored, such as through a time series database (e.g., INFLUX DB), to obtain and verify time series data to authenticate a client device. In another example, an authentication operation may compare a permission level of a client device (e.g., viewing permission, member permission, administrator permission, etc.) with a previously stored permissions log file to determine that the client device has the proper authentication to perform a requested action (e.g., to initiate a backup/restore of data or content from the client device).

In some embodiments, a custom resource definition may be used to define one or more custom objects (custom resources) within the container orchestration platform (Kubernetes) of the cloud environment, such as to define a storage volume custom object. A custom object may extend native capabilities (beyond standard objects natively supported by Kubernetes) of the container orchestration platform by creating and/or adding any type of API object as a custom object. In some embodiments, Kubernetes may natively provide a Kubernetes storage volume as a directory or block device mounted inside a container running in a pod. This Kubernetes storage volume is a native Kubernetes object, and is not a custom object defined through a custom resource definition. Kubernetes storage volumes represent physical devices managed by Kubernetes. Various embodiments can use a custom resource definition to extend native Kubernetes capabilities in order to define and create a storage volume as a custom object that can be used by an application. This storage volume may be referred to as a storage volume custom object that is not a native Kubernetes object. In some embodiments, the custom resource definition may be created through a .yaml file, and comprises various fields used to define the storage volume custom object. Various types of custom objects may be defined through custom resource definitions, such as storage volumes, snapshots, nodes, clusters, backup functionality, restore functionality, etc. These custom resource definitions may be stored within the storage platform of the distributed storage architecture 300. In some embodiments, a storage volume created as a custom object may be a storage device in the storage platform.

In some embodiments, the custom resource definition may comprise a custom resource specification for a storage volume (e.g., a storage volume clone), which may be populated with information (metadata) such as a storage volume clone identifier, a cluster name, a display name, an export policy, permissions information, a quality of service policy, a size of the storage volume, a snapshot reserve percentage (e.g., an amount of storage reserved for snapshots of the storage volume), access types allowed for the storage volume, a storage volume path of the storage volume, etc. In some embodiments, the custom resource specification may be populated by an application to define a command (a control plane operation) targeting the storage volume or to define/provision the storage volume. The custom resource definition may comprise a status field for the storage volume (e.g., the storage volume clone), which may be populated with information (metadata) such as the storage volume clone identifier, the cluster name, conditions (e.g., a last transition time, a message of whether the storage volume is online, a reason for the message such as because the storage volume is online, a status of the message such as the message being true, a type of the message such as a storage volume_online_type, etc.), whether the storage volume was successfully created, a display name, an export address, an export policy, an internal name, permissions information, a quality of service policy, a requested storage volume size, a restore cache size, a size of the storage volume, a snapshot reserve percentage, a state of the storage volume, a storage volume path, a storage volume UUID, etc. The status field may be populated by a control plane controller with information from a response received by a node that implemented a control plane operation to provision the storage volume. In this way, the status field may be used by the control plane controller to communicate information to the application regarding execution of the control plane operation. Similarly, the control plane controller can populate an events field with storage state information of the storage volume and/or warning information relating the execution of the control plane operation (e.g., a size of the storage volume being provisioned is too large, a name for the storage volume is already assigned to an existing storage volume, etc.). A first node (e.g., first node 307) assigned to the storage volume (e.g., storage) may send a first response and a second node assigned to the storage volume may send a second response. The responses may differ depending on which worker node is designated as the owner of the storage.

Figure 4:
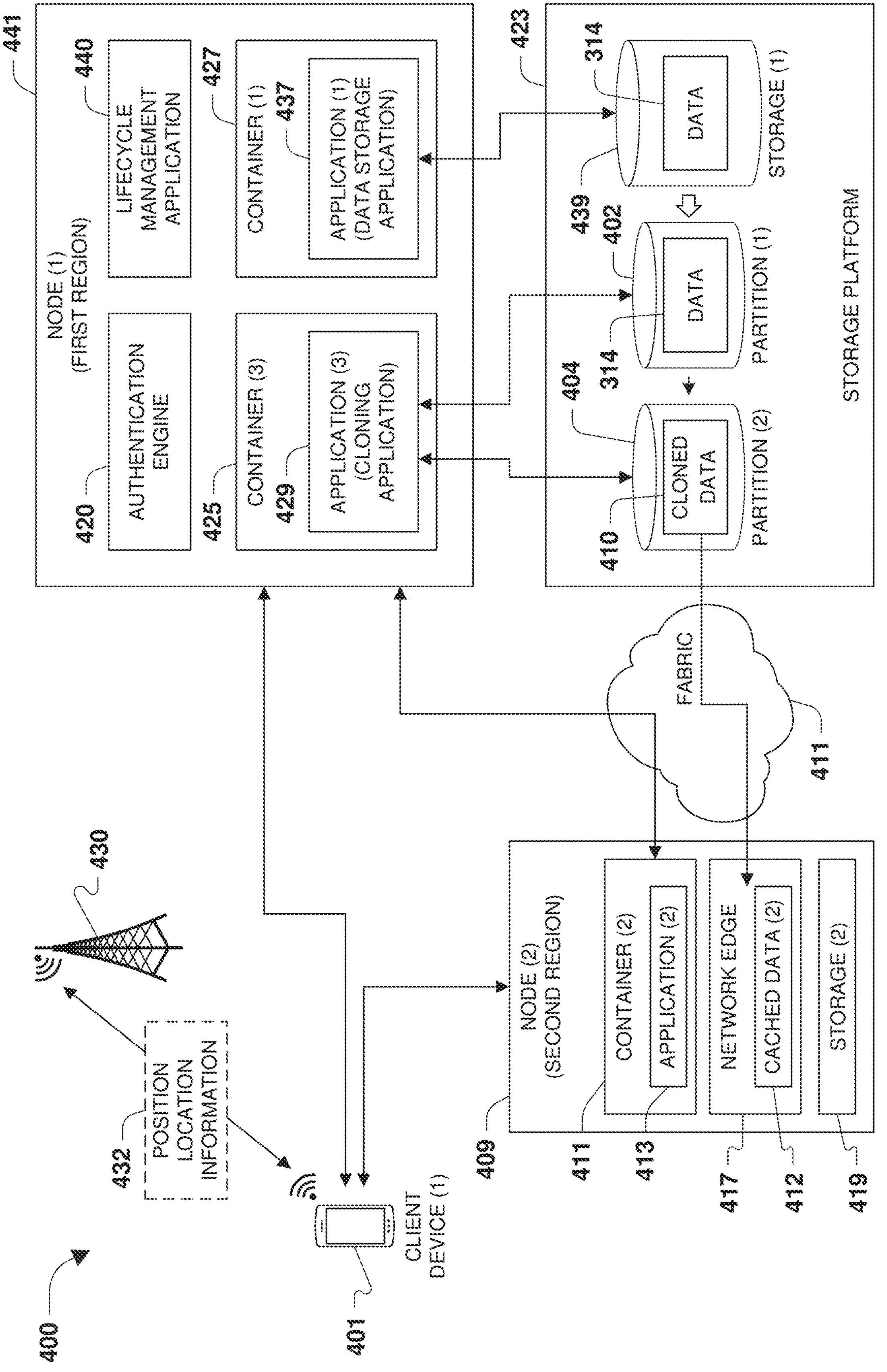
FIG. 4 is a block diagram illustrating an example of a distributed storage architecture in accordance with various embodiments of the present technology.

FIG. 4 is a block diagram illustrating an example of a distributed storage architecture 400 in accordance with various embodiments of the present technology. In some embodiments, the distributed storage architecture 400 may provide data management for a client device 401 in the form of a mobile device, such as a cellular telephone. In some embodiments, the first container 427 hosted by the first node 441, may host the first application 437, such as a data storage application. The first application 437 may store data 314 within a storage platform 423, such as within first storage 439 in the first region 102 of the cloud environment.

The storage platform 423 may comprise various partitions of storage (e.g., different storage buckets hosted by various cloud providers) that may be accessible to different applications, such as a first partition 402 and a second partition 404 accessible to the third application 429 (e.g., a cloning application) that is configured to clone data 314 from the first partition 402 to the second partition 404 as cloned data 410.

In some embodiments, the data 314 in the first storage 439 is stored in the first partition 402. The first node 441 may host the third application 429 within the third container 425 of the container orchestration platform, wherein the third application 429 is hosted at the first region 102 of the cloud environment. In some embodiments, the third application 429 may be a cloning application to perform a cloning operation to clone the data 314 from the first partition 402 to the second partition 404 as cloned data 410.

After completion of the cloning operation, the third application 429 may communicate the cloned data 410 across a fabric of the cloud environment, such as from the first node 441 at the first region 102 to the second node 409 at the second region 104, which includes second storage 419. The third application 429 may then cache the cloned data 410 as cached data 412 (e.g., a cached snapshot) within the network edge 417 of the second region 104 for access by the second application 413 hosted by the second container 411.

In some embodiments, the first node 441 includes an authentication engine 420 to authenticate the client device 401 in the first region 102 of the cloud environment with the first application 437 within the first container 427 of a container orchestration platform. The authentication engine 420 may authenticate a second client device (e.g., the second client device 322) in the second region 104 of the cloud environment with the first application 437 within the first container 427 of the container orchestration platform. The authentication engine 420 may thereby share access to the first container 427 with the client device 401 and the second client device (e.g., the second client device 322) based upon the authentication.

In some embodiments, the client device 401 may physically move between regions, such as between the first region 102 and the second region 104. In some embodiments, the client device 401 may be embodied in the form of a mobile device that communicates with a cellular telephone tower 430 to obtain position location information 432. The client device 401 may obtain the position location information 432 through other techniques, such as receiving a satellite based global positioning system (GPS) signal, or other position location techniques (e.g., a location identified from an IP address of the client device 401, a MAC address of the client device 401, a profile or account information of a user of the client device 401 with a cloud provider, etc.). In some embodiments, the position location information 432 may be identified with metadata, as set forth herein, which may be communicated to a lifecycle management application 440 of the first node 441 and/or the first application 437 (data storage application).

In some embodiments, the first application 437 may be configured to provide backup and/or restore of data from the client device 401. In some embodiments, the first application 437 may be registered with the lifecycle management application 440. The lifecycle management application 440 may be configured to instruct the third application 429 to perform the cloning operation of the data 314. In some embodiments, the lifecycle management application 440 may instruct, after registering the first application 437 with the lifecycle management application 440, the third application 429 to perform the cloning operation.

In some embodiments, the lifecycle management application 440 may determine that the second application 413 has a threshold probability of accessing the data 314 of the first application 437 based upon an indication that the data is a snapshot that is accessible for the second application 413 to perform a restore for the client device 401. In some embodiments, the lifecycle management application 440 may determine that the client device 401 has a threshold probability of accessing the data of the second region 104 of the cloud environment. In some embodiments, the second application 413 may access the cached data 412 to perform a restore of the cached data 412 to the client device 401 based upon the indication.

In some embodiments, the lifecycle management application 440 may evaluate various conditions to determine whether the second application 413 has a threshold probability of accessing the data 314 of the first application 437. In some embodiments, a condition may relate to second application 413 historically/routinely accessing data generated by the first application 437 (e.g., the second application 413 previously restored a volume using a snapshot created by the first application 437). In some embodiments, a condition may relate to the second application 413 being configured as a failover partner of the first application 437 such that the second application 413 is configured to take over operations relating to the data 314 that was previously managed by the first application 437 (e.g., client I/O is routed from the first application 437 to the second application 413 in the event the first application 437 fails).

In some embodiments, a condition may relate to the second application 413 being configured as a redundant replica of the first application 437 where clients can access data through either the first application 437 or the second application 413 (e.g., the applications may asynchronously replicate data to one another through snapshots over time). In some embodiments, a condition may relate to whether the first and second applications are the same application type (e.g., both applications are database applications, text editor applications, backup and restore applications, etc.). In some embodiments, a condition may relate to whether one application generates a type of data/file that the other application can interpret. In some embodiments, a condition may relate to historic sharing of data between the applications. In some embodiments, a condition may relate to whether a same client or tenant owns or has accessed both applications. In some embodiments, a condition may relate to whether the applications are hosted within different regions or on different hardware for improved resiliency to failures (e.g., identified from the position location information 432). It may be appreciated that a variety of other conditions may be taken into account to determine whether the second application 413 has a threshold probability of accessing the data 314 of the first application 437.

The lifecycle management application 440 may assign weights to each condition based upon how indicative a condition is that the second application 413 will or will not access the data 314 of the first application 437 within a particular timespan (e.g., within a day, a week, or any other timespan where caching of the data would be advantageous and provide the second application 413 with quick access to the data when needed). That is, some conditions may be more relevant and better indicators to take into account when determining whether an application will or will not access data generated by another application, and thus weights may be assigned to the conditions based upon how much consideration should be given to the conditions. In some embodiments, a first weight may be assigned to a condition where the second application 413 is the failover partner for the first application 437 (e.g., a weight of 0.9 on a scale of 0 to 1 where 0 corresponds to a condition that is not very relevant and 1 corresponds to a very relevant indicator to take into account). A second weight may be assigned to a condition where the second application 413 is the redundant replica of the first application 437 (e.g., a weight of 0.85). In this way, weights may be assigned based upon how much consideration should be given to a particular condition.

In some embodiments of assigning weights, a weight may be a value indicative of how likely an application will access data generated by another application based upon the specifics of the condition. A low weight (or a negative weight) may be assigned to a condition where the second application 413 (e.g., a text editor application) is a different type of application than the first application 437 (e.g., a social network application) because the second application 413 may have a low likelihood of accessing data generated by the first application 437 (e.g., a weight of 0.1). Similarly, a low weight (or negative weight) may be assigned to a condition where the second application 413 and the first application 437 do not support the same file or data types (e.g., an image vs. a text document) because the second application 413 cannot open or access data generated by the first application (e.g., a weight of 0.05).

In some embodiments, the lifecycle management application 440 may combine the conditions and/or weights as a total value that may be compared to a threshold (e.g., a threshold of 4 on a scale of 0 to 6 where 6 conditions are taken into account that each have a weight from 0 to 1) to determine whether the second application 413 has the threshold probability of accessing the data 314 of the first application 437. In some embodiments, the lifecycle management application 440 may compare an average of the conditions and/or weights to a threshold (e.g., a threshold of 0.8 on the scale of 0 to 1) to determine whether the second application 413 has the threshold probability of accessing the data 314 of the first application 437.

Figure 5:
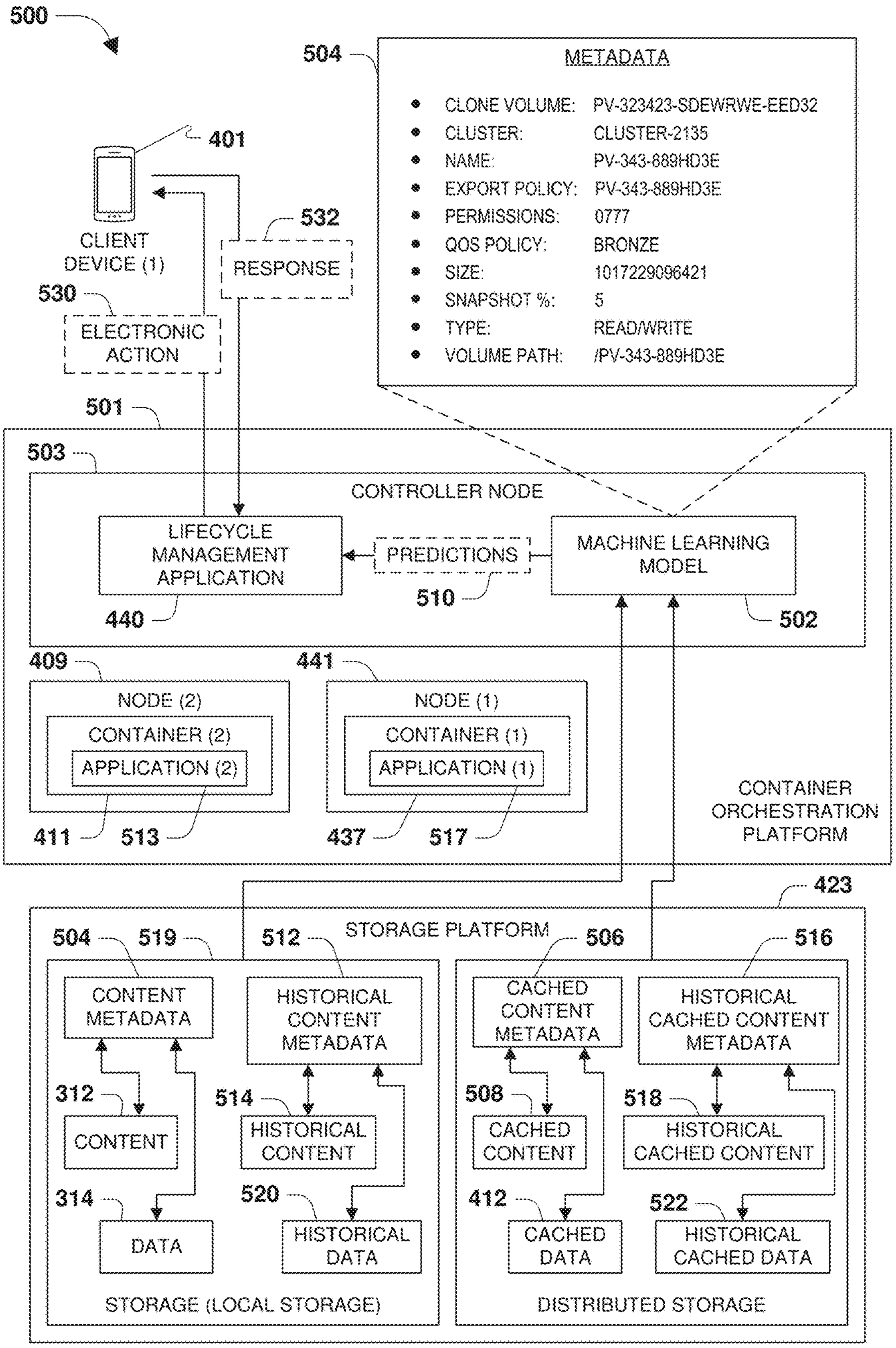
FIG. 5 is a block diagram illustrating an example of a distributed storage architecture in accordance with various embodiments of the present technology.

FIG. 5 is a block diagram illustrating an example of a distributed storage architecture 500 in accordance with various embodiments of the present technology. In some embodiments, the lifecycle management application 440 or various instances of the lifecycle management application 440 may be hosted by the controller node of the container orchestration platform 501. In some embodiments, a trained machine learning model 502 may receive content metadata 504 associated with content 312 and may receive cached content metadata 506 associated with cached content 508 stored across the multiple regions of the cloud environment. Examples of content metadata 504 include: CLONE VOLUME, CLUSTER, NAME, EXPORT POLICY, PERMISSIONS, QOS POLICY, SIZE, SNAPSHOT %, TYPE, VOLUME PATH, etc.

Other examples of content metadata 504 include scheduling information from the client device 401, such as calendar information indicating that a user associated with the client device 401 is intending to travel between regions of the cloud environment. In some embodiments, the content metadata 504 is associated with data 314 within the storage 519 located within the first region of the cloud environment and the cached content metadata 506 is associated with cached data 412 within the network edge of the second region 503. The lifecycle management application 440 may receive predictions 510 from the trained machine learning model 502 indicating a probability of accessing the data 314 of the first application 517 by a client device (e.g., the first client device) based upon the content metadata 504. The predictions 510 may be generated by the trained machine learning model 502 that uses the conditions and/or weights (e.g., weights may be optional) as input, and outputs a likelihood that the second application 513 has the threshold probability of accessing the data 314 of the first application 517. In some embodiments, the predictions 510 may specify a percentage likelihood that the trained machine learning model 502 predicts that the second application 513 has a threshold probability of accessing the data 314 of the first application 517. The lifecycle management application 440 may then determine that the second application 414 has the threshold probability of accessing the data 314 of the first application 517 based upon the predictions 510.

In some embodiments, the machine learning model 502 is trained with historical content metadata 512 associated with historical content 514 and historical cached content metadata 516 associated with historical cached content 518 stored across the multiple regions of the cloud environment. In some embodiments, the historical content metadata may comprise information relating to whether applications historically accessed data of other applications under the various conditions previously discussed (e.g., whether an application previously performed a restore operation using a snapshot generated by a different application). The historical content metadata may further include the frequencies of access under particular combinations of conditions. The historical content metadata may specify the types of applications, the types of data, and/or the types of access (e.g., a restore operation, a read operation, a write operation, etc.) that were performed by applications that were accessing, sharing, replicating, backing up, or restoring data. In this way, the historical content metadata may include information relating to what conditions existed when applications did and when applications did not access data generated by other different applications. The patterns within the historical content metadata can be used to set internal parameters and weights of the machine learning model 502 for outputting predicted likelihoods that an application will access data of another application based upon certain conditions (e.g., whether the applications are of the same type, whether the applications support the same types of data/files, whether the applications are commonly owned by the same client, whether the applications are maintained as failover applications or replica applications of one another, etc.).

In some embodiments, the historical content metadata 512 is associated with historical data 520 within the storage 519 located within the first region of the cloud environment and the historical cached content metadata 516 is associated with historical cached data 522 within the network edge of the second region 503.

In some embodiments, the lifecycle management application 440 may generate an electronic action 530 (e.g., a command, a request, a message, electronic communication, etc.) for delivery to a client device (e.g., the client device 401) indicating that the second application 414 has the threshold probability of accessing the data 314 of the first application 517 based upon the predictions 510. The lifecycle management application 440 may then receive a response 532 to the electronic action 530 to access the cached data 412 by the second application 513 to perform a restore of the cached data 412 to the client device 401 based upon the response 532. In some embodiments, data and/or other communication may be received by the trained machine learning model 502 from the client device 401. In some embodiments, the content metadata 504 may be received by the trained machine learning model 502 from the client device 401. In another example, the content 312 and/or the data 314 may be received from the client device 401.

In some example implementations, the machine learning model 502 may include one or more models for generating the predictions 510. In some embodiments, the machine learning model 502 may include one or more of an exploratory factor analysis model, a confirmatory factor analysis model, a principal component analysis model, a k-means clustering model, a least absolute shrinkage and selection operator (Lasso) regression analysis model, an artificial neural network model, non-linear regression model, decision tree model, a fuzzy logic model, and/or another model.

In some example implementations, the exploratory factor analysis model may include a statistical model used to uncover an underlying structure of a relatively large set of variables. In some embodiments, the exploratory factor analysis model may perform a factor analysis technique to identify underlying relationships between measured variables. Measured variables may include any one of several attributes, such as the attributes described herein. Measured variables may be stored, observed, measured, and/or generated (e.g., as part of operations performed by the data management system, the storage management system, or the storage manager). The exploratory factor analysis model may be based on a common factor model, within which a function of common factors, unique factors, and errors of measurement expresses measured variables. Common factors may influence two or more measured variables, while each unique factor may influence one measured variable and does not explain correlations among measured variables.

In some example implementations, the confirmatory factor analysis model may include a form of factor analysis that may be used to test whether measures of a construct are consistent with a preliminary conception of a nature of the construct. An objective of the confirmatory factor analysis model may be to test whether data fits a hypothesized measurement model that may be based on theory and/or previous analytic research.

In some example implementations, the principal component analysis model may include a statistical procedure that uses an orthogonal transformation to convert a set of observations of possibly correlated variables into a set of values of linearly uncorrelated variables called principal components. A number of distinct principal components may be equal to a smaller of a number of original variables or a number of observations minus one. The orthogonal transformation may be defined in such a way that a first principal component has a largest possible variance, and each succeeding component in turn has a highest variance possible under a constraint that it may be orthogonal to preceding components. Resulting vectors may include an uncorrelated orthogonal basis set.

In some example implementations, the k-means clustering model may be applied to partition (n) observations into (k) clusters in which each observation belongs to a cluster with a nearest mean, serving as a prototype of the cluster, which results in a partitioning of a data space into Voronoi cells. The k-means clustering model may utilize efficient heuristic methods that converge quickly to a local optimum.

In some example implementations, the Lasso regression analysis model may include a regression analysis model that performs both variable selection and regularization in order to enhance a prediction accuracy and interpretability of a statistical model that the Lasso regression analysis model produces. In some embodiments, the Lasso regression analysis model may include a shrinkage and selection model for linear regression, and may seek to obtain a subset of predictors that minimizes prediction error for a quantitative response variable. In some example implementations, the Lasso regression analysis model may minimize a prediction error by imposing a constraint on model parameters that cause regression coefficients for some variables to shrink towards zero. Variables with a regression coefficient equal to zero after the shrinkage process may be excluded from the model, while variables with non-zero regression coefficient variables may be most strongly associated with the quantitative response variable.

In some example implementations, the artificial neural network model may use an artificial neural network to perform machine learning. An artificial neural network may utilize a collection of connected units or nodes, also known as artificial neurons. Each connection between artificial neurons may transmit a signal from one artificial neuron to another artificial neuron. An artificial neuron that receives the signal may process the signal and then provide a signal to artificial neurons connected to the artificial neuron. In some artificial neural network implementations, the signal at a connection between artificial neurons may be a real number, and the output of each artificial neuron may be calculated by a non-linear function of the sum of its inputs. Artificial neurons and connections may have a weight that adjusts as learning proceeds. The weight may increase or decrease the strength of the signal at a connection. An artificial neuron may have a threshold such that the artificial neuron only sends a signal if the aggregate signal satisfies the threshold. Artificial neurons may be organized in layers, and different layers may perform different kinds of transformations on their inputs.

In some example implementations, the non-linear regression model may apply non-linear regression analysis to perform machine learning. Non-linear regression may be a form of regression analysis in which observational data are modeled by a function which may be a non-linear combination of the model parameters and depends on one or more independent variables. The observational data may be fitted by successive approximations. The non-linear function may be, in some embodiments, an exponential function, a logarithmic function, a trigonometric function, a power function, a Gaussian function, and/or another function.

In some example implementations, the decision tree model may use a decision tree data structure to perform machine learning. A decision tree data structure may classify a population into branch-like segments that form an inverted tree with a root node, internal nodes, and leaf nodes. In some embodiments, the decision tree learning model may use a decision tree as a predictive model to map observations about an item (represented in the branches of the tree data structure) to conclusions about the item target value (represented in the leaves of the tree data structure). Building a decision tree may include partitioning the data set into subsets, shortening of branches of the tree, and selecting a tree (e.g., the smallest tree) that fits the data. In some example implementations, a decision tree model may be a classification tree (where the target variable can take a discrete set of values) in which leaves represent class labels and branches represent conjunctions of features that lead to those class labels. In some example implementations a decision tree model may be a regression tree (e.g., where the target variable can take continuous values, such as real numbers).

In some example implementations, the fuzzy logic model may apply fuzzy logic to perform machine learning. Fuzzy logic may be a form of many-valued logic in which the truth values of variables may be any real number between zero and one. Fuzzy logic may be employed to represent the concept of partial truth, where the truth value may range between completely true and completely false, as opposed to Boolean logic, where the truth values of variables may only be the integer values zero or one, representing only absolute truth or absolute falseness. The fuzzy logic model may include variations of existing machine learning techniques in which fuzzy logic may be applied. Other arrangements, configurations, and/or implementations of the machine learning model 502 are within the scope of the present disclosure.

Figure 6A:
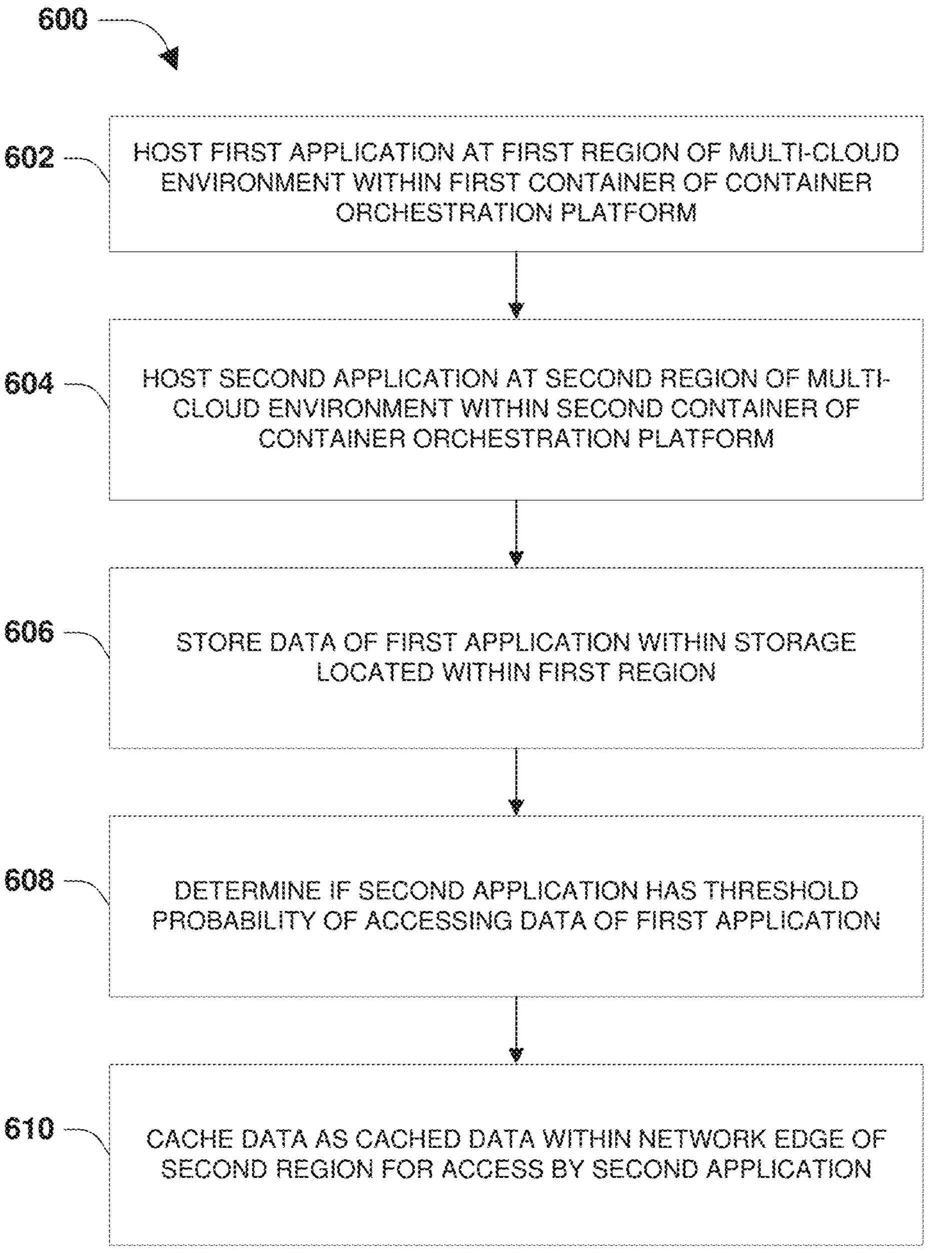
FIG. 6A is a flow chart illustrating an example of a set of operations that can be used for controlling operations in a distributed storage architecture in accordance with various embodiments of the present technology.

FIG. 6A is a flow chart illustrating an example method 600 of a set of operations that can be used for controlling operations in a distributed storage architecture of a cloud computing environment in accordance with various embodiments of the present technology. As part of the example method 600, a container orchestration platform spans across multiple regions of a cloud environment. In some embodiments, the container orchestration platform may span across multiple regions, such as the first region, the second region, the third region, etc., of the cloud environment.

At 602, a first application within a first container of the container orchestration platform is hosted at a first region of the cloud environment. In some embodiments, the first application within the first container of the container orchestration platform may be hosted at the first region of the cloud environment. At 604, a second application within a second container of the container orchestration platform is hosted at a second region of the cloud environment. In some embodiments, the second application within the second container of the container orchestration platform may be hosted at the second region of the cloud environment. At 606, data of the first application is stored within storage located within the first region of the cloud environment. In some embodiments, data of the first application may be stored within the first storage located within the first region of the cloud environment.

At 608, a determination is made whether the second application has a threshold probability of accessing the data of the first application. In some embodiments, the lifecycle management application may determine that the second application has a threshold probability of accessing the data of the first application based upon an indication that the data is a snapshot that is accessible for the second application to perform a restore for the client device. At 610, the data is cached as cached data within a network edge of the second region for access by the second application. In some embodiments, the data from the first storage may be cached as the cached data within the network edge of the second region 104 for access by the second application.

Figure 6B:
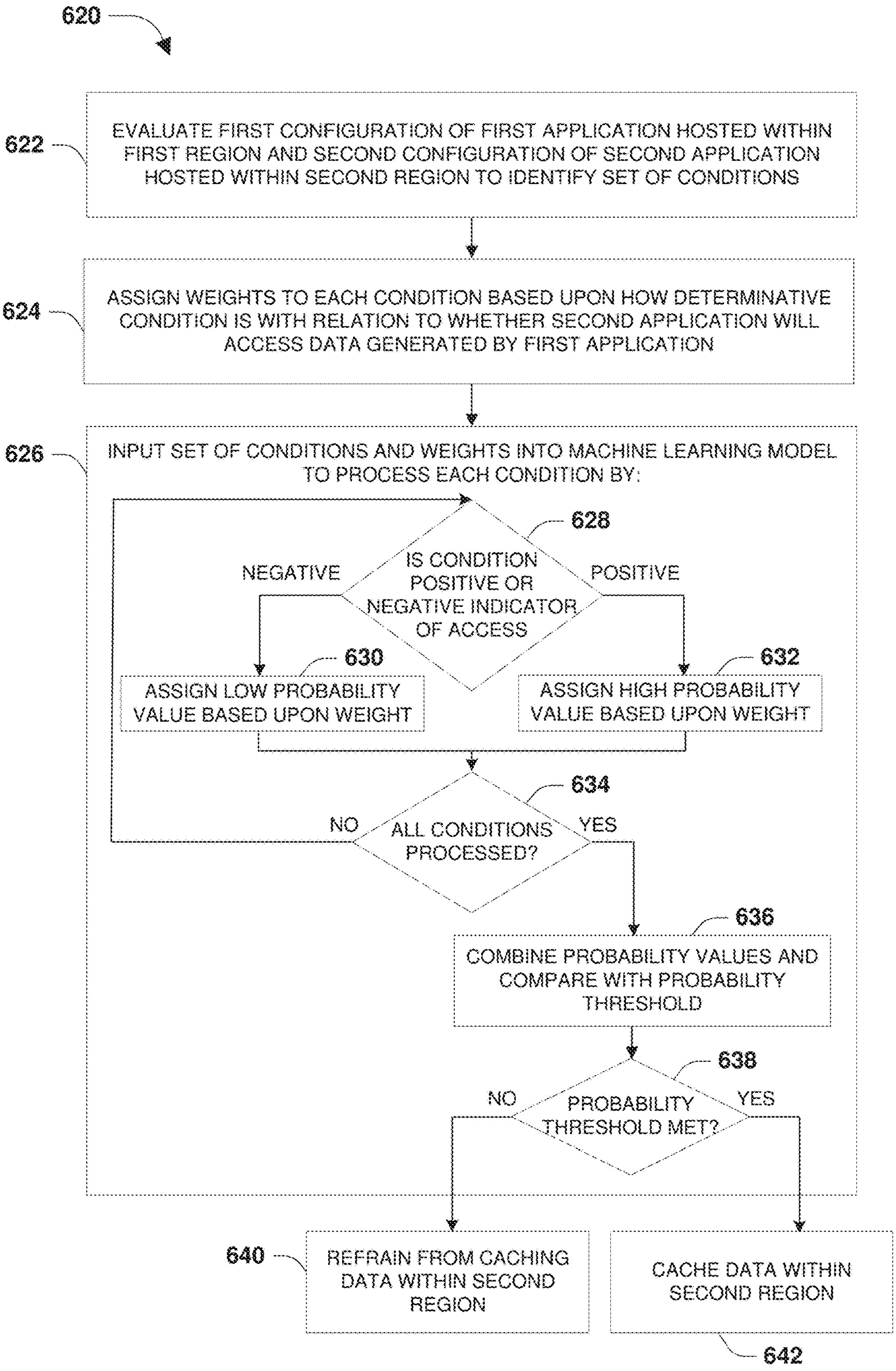
FIG. 6B is a flow chart illustrating an example of a set of operations used to determine whether an application has a probability threshold of accessing data of another application in accordance with various embodiments of the present technology.

FIG. 6B is a flow chart 620 illustrating an example of a set of operations used to determine whether an application has a probability threshold of accessing data of another application in accordance with various embodiments of the present technology. During operation 622, a storage management system accesses a first configuration of a first application hosted within a first region of a cloud computing environment and a second configuration of a second application hosted within a second region of the cloud computing environment. The first configuration may correspond to metadata or other information (e.g., a manifest file, a pod specification of a pod hosting a container within which the first application is executing, metadata of a container image of the container hosting the first application, a YAML file describing the first application, metadata extracted from a Kubernetes environment within which the first application is hosted, etc.) describing the first application. The first configuration may specify an application type of the application (e.g., a backup application, a database application, a text editor, an image hosting service, etc.), data types supported by the first application (e.g., types of files that the first application can open and access), any relationships of the first application (e.g., whether the first application is a replica application for another application, whether the first application is a failover application for another application, whether the first application is a backup application that creates snapshots that are to be available to another application capable of restoring the snapshots, etc.), one or more clients owning or having access to the first application, historic data access by the first application (e.g., has the first application accessed data generated by other applications and at what frequency and type of access), etc.

During operation 624, the storage management system may assign weights to each condition based upon how determinative a condition is (e.g., how much consideration to give a condition) for determining whether the second application will access data generated by the first application. That is, certain conditions may be more telling/determinative of whether an application will or will not access data generated by a different application than other conditions. In some embodiments, a condition relating to whether the second application is a failover replica of the first application may be a strong indicator as to whether the second application will or will not access data generated by the first application. In contrast, a condition relating to whether the first application and the second application are routinely accessed by the same client device may be a weaker indicator (but still an indicator) as to whether the second application will or will not access data generated by the first application. In some embodiments, operation 624 may be optional, and instead, all conditions are given the same consideration or weight.

During operation 626, the set of conditions and/or the weights are input into a machine learning model that has been trained to output predictions as to how likely it is that an application will access data generated by another application based upon whether certain conditions are present. In some embodiments, the machine learning model utilizes various parameters, model weights, and/or other functionality to process the set of conditions and/or the weights to determine a predicted likelihood that the second application will access data generated by the first application. In some embodiments, the machine learning model may evaluate each condition to determine whether a condition is a positive or negative indicator that the second application will access data generated by the first application, during operation 628. If a condition indicates that the applications are owned and accessed by different clients (or the applications do not support the same types of files), then the condition may be a negative indicator. If the condition indicates that the applications are owned and accessed by the same client (or the applications support the same types of files), then the condition may be a positive indicator. A weight assigned to the condition may be used to determine how much consideration/weight is to be given to the condition by the machine learning model. If the condition is a negative indicator, then a relatively low probability (e.g., a probability of 0.2 on a scale of 0 to 1) may be identified by the machine learning model based upon the weight assigned to the condition, during operation 630. If the condition is a positive indicator, then a relatively high probability (e.g., a probability of 0.8) is identified based upon the weight assigned to the condition, during operation 632.

During operation 634, a determination is made as to whether all conditions have been processed and assigned probability values. If there are still other conditions to process, then the storage management system returns to operation 628. Otherwise, if all conditions have been processed and assigned probability values, then the probability values are combined (or averaged) and compared with a probability threshold, during operation 636. In some embodiments, a probability value for a condition may be on a scale of 0 to 1, and there may be 8 total conditions. In some embodiments, the probability values may be averaged and compared to the probability threshold (e.g., a probability threshold of 0.8 or any other value between 0 and 1). During operation 638, a determination is made as to whether the probability threshold is met. If the probability threshold is not met (e.g., the average of the probability values is 0.6), then the data is not cached within the second region, during operation 640. If the probability threshold is met (e.g., the average of the probabilities is 0.9), then the data is cached within the second region, during operation 642.

Figure 7:
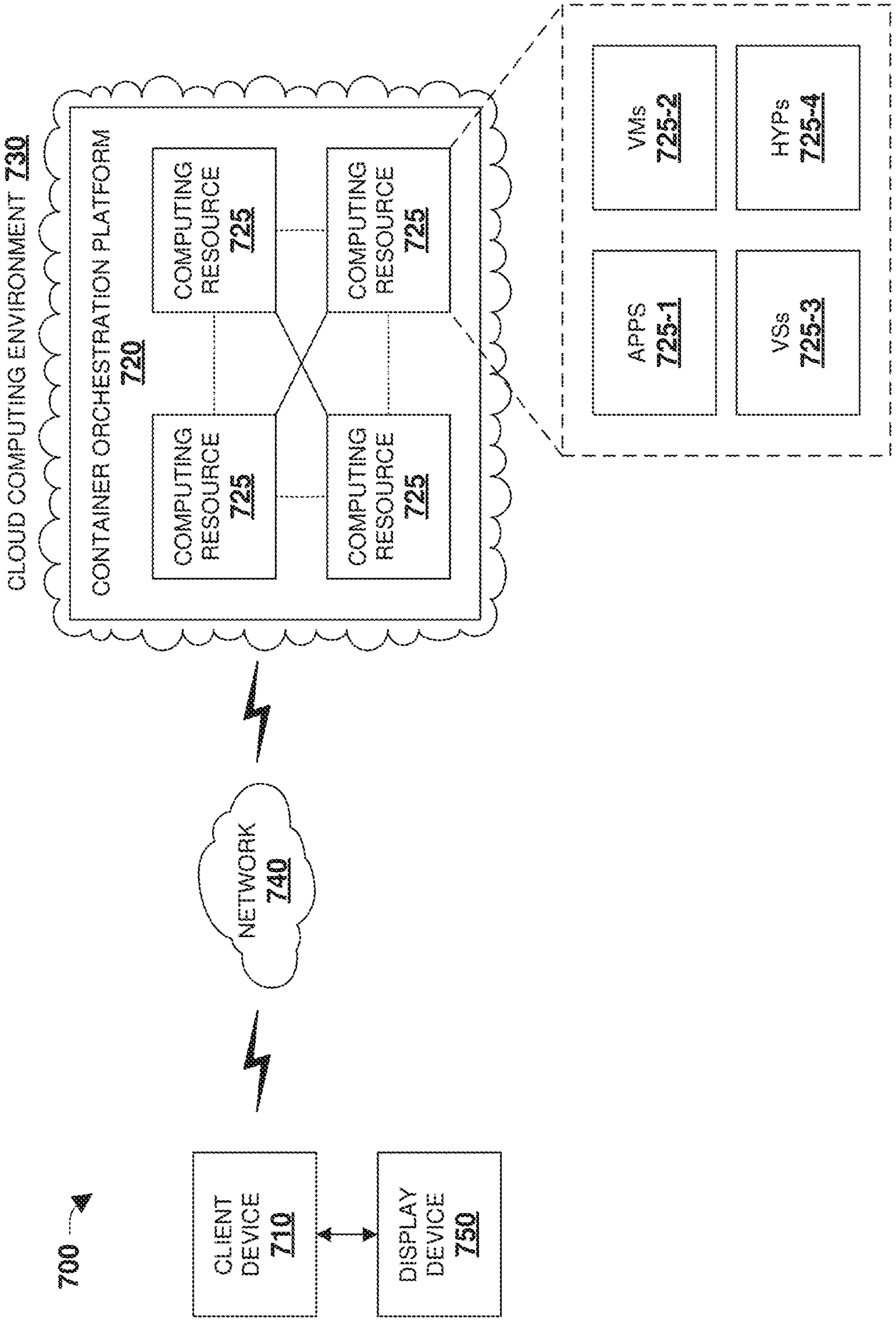
FIG. 7 is a block diagram illustrating an example environment in which systems and/or methods can be implemented in accordance with various embodiments of the present technology.

FIG. 7 is a diagram of an example environment 700 in which systems and/or methods, described herein, can be implemented. As shown in FIG. 7, the example environment 700 can include a client device 710, a container orchestration platform 720, a computing resource 725, a cloud computing environment 730, a network 740, and a display device 750. Devices of the example environment 700 can interconnect via wired connections, wireless connections, or a combination of wired and wireless connections.

The client device 710 includes one or more devices capable of receiving, generating, storing, processing, and/or providing information associated with displaying time-based content and on-demand content in a grid-based programming guide. In some embodiments, the client device 710 can include a communication and/or computing device, such as a set-top box, a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, the client device 710 can provide an instruction to generate a GUI, provide the instruction to the display device 750, receive an input associated with a first on-demand content provider, establish, based on receiving the input, a session with the container orchestration platform 720, associated with the first on-demand content provider, and provide, based on establishing the session with container orchestration platform 720, a second instruction to display the content in the GUI via the session with the content platform to display device 750, and/or the like.

The container orchestration platform 720 includes one or more computing resources capable of receiving, generating, storing, processing, and/or providing data associated with displaying time-based content and on-demand content in a grid-based programming guide. In some embodiments, the container orchestration platform 720 can be a platform implemented by the cloud computing environment 730. In some implementations, the container orchestration platform 720 is implemented by the computing resources 725 of cloud computing environment 730. In some implementations, the container orchestration platform 720 can store and/or provide access to various types of content, such as on-demand content associated with an on-demand content provider (e.g., on-demand movies, on-demand television shows, and/or the like), web-based content associated with the content provider (e.g., a web page associated with a particular on-demand content element, a home page associated with the on-demand content provider, and/or the like), and/or the like.

The cloud computing environment 730 includes an environment that hosts the container orchestration platform 720. The cloud computing environment 730 can provide computation, software, data access, storage, and/or other services that do not require end-user knowledge of a physical location and configuration of a system and/or a device that delivers the services. As shown, the cloud computing environment 730 can include the container orchestration platform 720 and the computing resource 725.

The computing resource 725 includes one or more personal computers, workstation computers, server devices, nodes, or another type of computation and/or communication device. In some implementations, the computing resource 725 can host the container orchestration platform 720. The cloud resources can include compute instances executing in the computing resource 725, storage devices provided in the computing resource 725, data transfer devices provided by the computing resource 725, and/or the like. In some implementations, the computing resource 725 can communicate with other computing resources 725 via wired connections, wireless connections, or a combination of wired and wireless connections.

As further shown in FIG. 7, the computing resource 725 can include a group of cloud resources, such as one or more applications ("APPs") 725-1, one or more virtual machines ("VMs") 725-2, virtualized storage ("VSs") 725-3, one or more hypervisors ("HYPs") 725-4, or the like.

Application 725-1 includes one or more software applications that can be provided to or accessed by client device 710. Application 725-1 can eliminate a need to install and execute the software applications on client device 710. In some embodiments, application 725-1 can include software associated with container orchestration platform 720 and/or any other software capable of being provided via cloud computing environment 730. In some implementations, one application 725-1 can send/receive information to/from one or more other applications 725-1, via virtual machine 725-2.

Virtual machine 725-2 includes a software implementation of a machine (e.g., a computer) that executes programs like a physical machine. Virtual machine 725-2 can be either a system virtual machine or a process virtual machine, depending upon use and degree of correspondence to any real machine by virtual machine 725-2. A system virtual machine can provide a complete system platform that supports execution of a complete operating system ("OS"). A process virtual machine can execute a single program, and can support a single process. In some implementations, virtual machine 725-2 can execute on behalf of a user (e.g., a user of client device 710), and can manage infrastructure of cloud computing environment 730, such as data management, synchronization, or long-duration data transfers.

Virtualized storage 725-3 includes one or more storage systems and/or one or more devices that use virtualization techniques within the storage systems or devices of computing resource 725. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 725-4 provides hardware virtualization techniques that allow multiple operating systems (e.g., "guest operating systems") to execute concurrently on a host computer, such as computing resource 725. Hypervisor 725-4 can present a virtual operating platform to the guest operating systems, and can manage the execution of the guest operating systems. Multiple instances of a variety of operating systems can share virtualized hardware resources.

Network 740 includes one or more wired and/or wireless networks. In some embodiments, network 740 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Display device 750 includes a device capable of displaying the GUI generated by client device 710. In some implementations, display device 750 can include a touch screen display, a monitor, a television, and/or the like. In some embodiments, display device 750 can receive the GUI, including the grid-based programming guide generated by client device 710, along with an instruction to display the GUI, and display device 750 can display the GUI based on receiving the GUI and the instruction.

The number and arrangement of devices and networks shown in FIG. 7 are provided as an example. In practice, there can be additional devices and/or networks, fewer devices and/or networks, different devices and/or networks, or differently arranged devices and/or networks than those shown in FIG. 7. Furthermore, two or more devices shown in FIG. 7 can be implemented within a single device, or a single device shown in FIG. 7 can be implemented as multiple, distributed devices. Additionally, or alternatively, a set of devices (e.g., one or more devices) of example environment 700 can perform one or more functions described as being performed by another set of devices of example environment 700.

Figure 8:
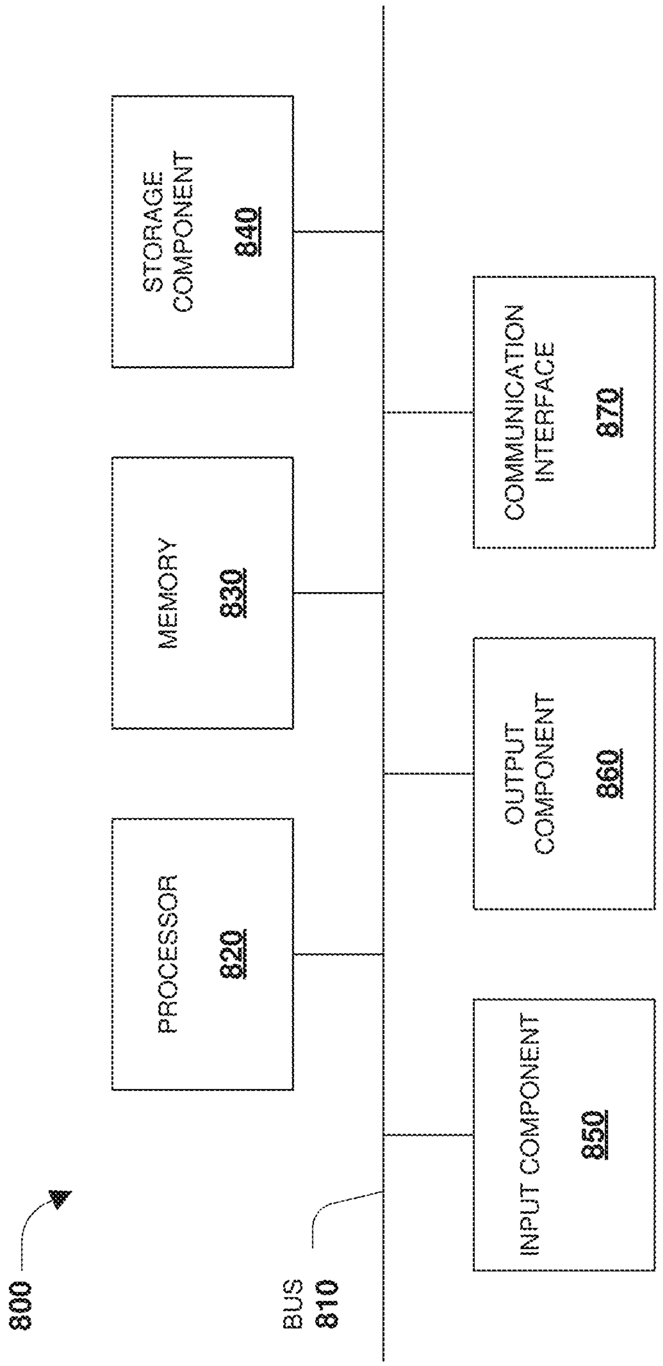
FIG. 8 is a block diagram illustrating example components of a device in accordance with various embodiments of the present technology.

FIG. 8 is a block diagram illustrating example components of a device 800 in accordance with various embodiments of the present technology. According to some embodiments, the device 800 may correspond to the first client device 390, the second client device 322, the client device 401, or the client device 710. As illustrated in FIG. 8, the device 800 may include a bus 810, a processor 820, a memory 830, a storage component 840, an input component 850, an output component 860, and a communication interface 870. The bus 810 may include a component that permits communication among the components of the device 800. The processor 820 may be implemented in hardware, firmware, or a combination of hardware and software. The processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), another type of processing component, or a combination thereof. In some implementations, the processor 820 includes one or more processors capable of being programmed to perform a function. The memory 830 may include a random access memory (RAM), a read only memory (ROM), and/or another type of dynamic or static storage device (e.g., a flash memory, a magnetic memory, and/or an optical memory) that stores information and/or instructions for use by the processor 820.

The storage component 840 stores information and/or software related to the operation and use of the device 800. In some embodiments, the storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The input component 850 includes a component that permits the device 800 to receive information, such as via user input (e.g., a touch screen display, a keyboard, a keypad, a mouse, a button, a switch, and/or a microphone). Additionally, or alternatively, the input component 850 may include a sensor for sensing information (e.g., a global positioning system (GPS) component, an accelerometer, a gyroscope, an actuator, and/or another type of sensor). The output component 860 may include a component that provides output information from device 800 (e.g., a display, a speaker, and/or one or more light-emitting diodes (LEDs)). The communication interface 870 includes a transceiver-like component (e.g., a transceiver and/or a separate receiver and transmitter) that enables the device 800 to communicate with other devices, such as via a wired connection, a wireless connection, or a combination of wired and wireless connections. The communication interface 870 may permit the device 800 to receive information from another device and/or provide information to another device. In some embodiments, the communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

The device 800 may perform one or more processes described herein. The device 800 may perform these processes based on the processor 820 executing software instructions stored by a non-transitory computer-readable medium, such as the memory 830 and/or the storage component 840. A computer-readable medium is defined herein as a non-transitory memory device. A memory device may include memory space within a single physical storage device or memory space spread across multiple physical storage devices. Software instructions may be read into the memory 830 and/or the storage component 840 from another computer-readable medium or from another device via the communication interface 870. When executed, software instructions stored in the memory 830 and/or the storage component 840 may cause the processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. The number and arrangement of the components shown in FIG. 8 are provided as an example. In practice, the device 800 may include additional components, fewer components, different components, or differently arranged components than those shown in FIG. 8. Additionally, or alternatively, a set of components (e.g., one or more components) of device 800 may perform one or more functions described as being performed by another set of components of the device 800.

Figure 9:
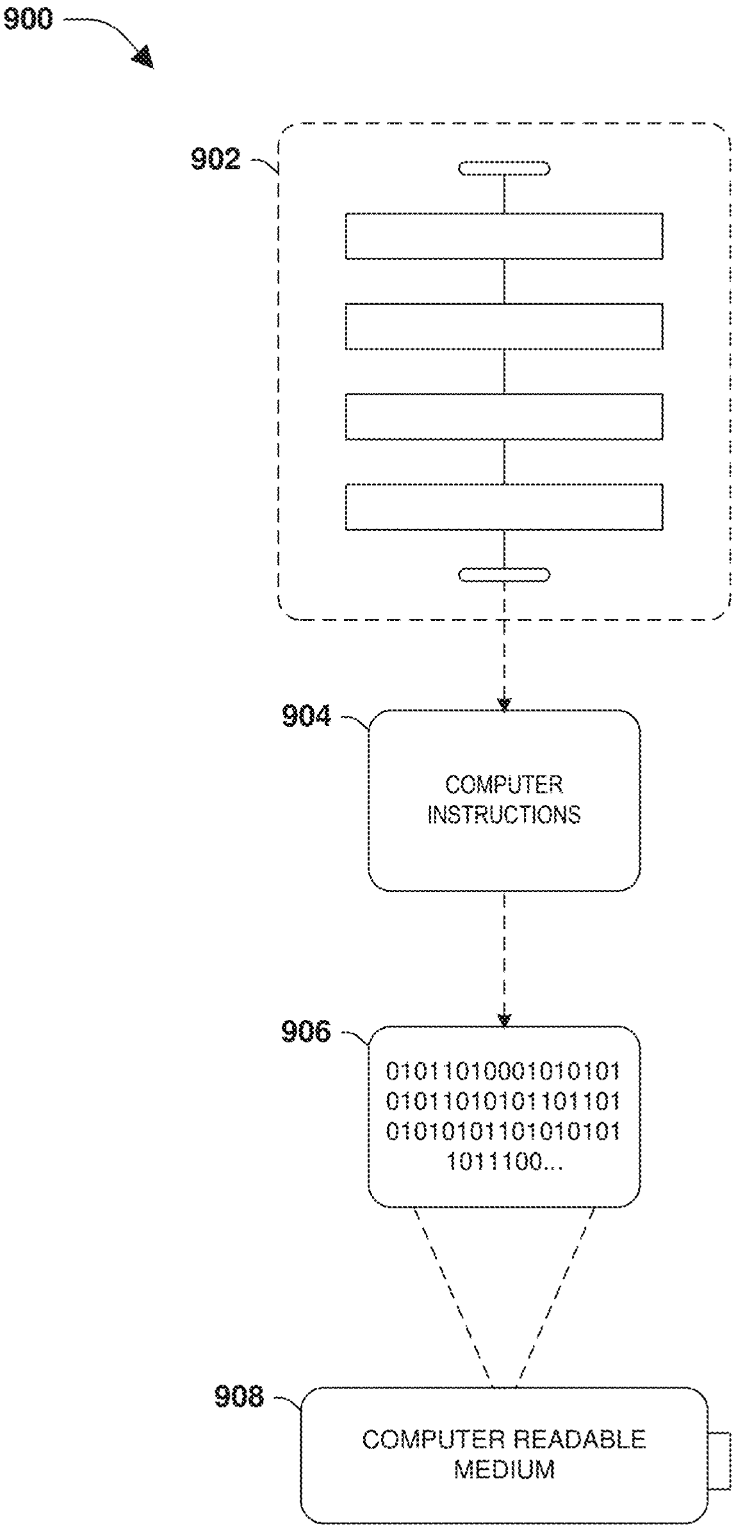
FIG. 9 is an example of a computer readable medium in which various embodiments of the present technology may be implemented.

FIG. 9 is an example of a computer-readable medium in which various embodiments of the present technology may be implemented. The computer-readable medium comprises processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the example method 600 of FIG. 6, in some embodiments. In some embodiments, the processor-executable computer instructions 904 are configured to implement a system, such as at least some of the example components of the cloud computing environment 100 of FIG. 1 and/or at least some of the example system components of FIGS. 2-5, in some embodiments. Many such computer-readable media are contemplated to operate in accordance with the techniques presented herein.

Figure 10A:
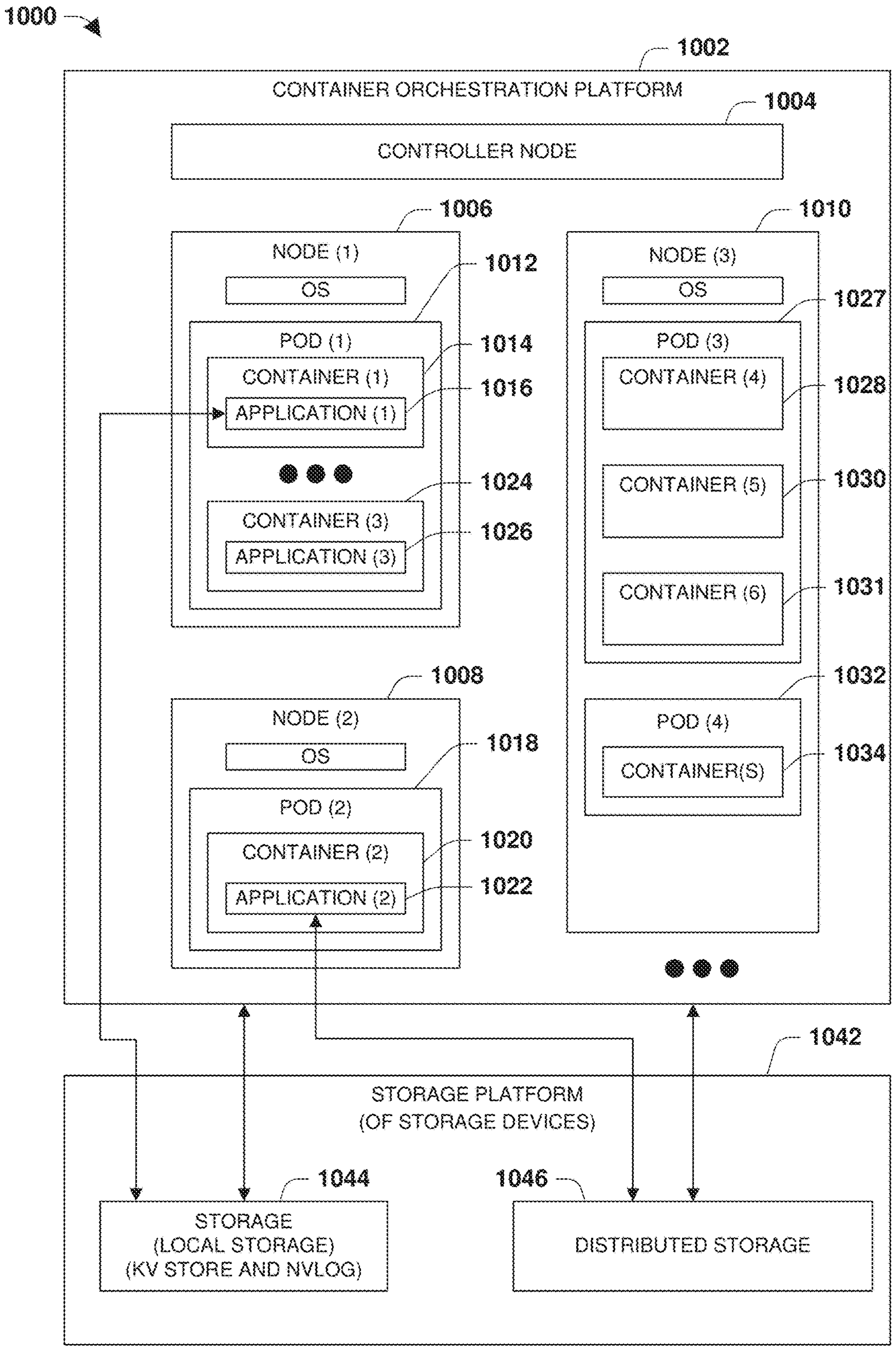
FIG. 10A is a block diagram illustrating an example of various components of a distributed storage architecture in accordance with various embodiments of the present technology.

FIG. 10A illustrates various components of a distributed storage architecture 1000 in accordance with various embodiments of the present technology. In some embodiments, the distributed storage architecture 1000 may be implemented through a container orchestration platform 1002 or other containerized environment, as illustrated by FIG. 10A. The container orchestration platform 1002 can automate storage application deployment, scaling, and management. One example of the container orchestration platform 1002 is Kubernetes. Core components of the container orchestration platform 1002 may be deployed on one or more controller nodes, such as a controller node 1004.

The controller node 1004 may be responsible for overall management of the distributed storage architecture 1000, and may run various components of the container orchestration platform 1002, such as an API server that implements the overall control logic, a scheduler for scheduling execution of containers on nodes, and/or a storage server where the container orchestration platform 1002 stores data. The distributed storage architecture 1000 may comprise a distributed cluster of nodes, such as worker nodes that host and manage containers, to receive and/or execute orders from the controller node 1004. In some embodiments, the controller node 1004 may monitor network traffic between the various other nodes over time (e.g., nodes spanning different regions of a cloud computing environment and/or across multiple cloud computing environments) to determine a threshold condition for triggering migration of data between storage devices in a storage platform. In some embodiments, the network traffic may be tracked to see if a node has previously accessed data generated by another node, and thus may have a likelihood of subsequently accessing data generated by the other node.

In some embodiments, the threshold condition may relate to a first application of a first node historically/routinely accessing data generated by a second application of a second node. The threshold condition may relate to whether the first application previously performed a restore operation using a snapshot generated by the second application. The threshold condition may relate to the first application being configured as a failover partner of the second application such that the first application takes over operations relating to data that was previously managed by the second application (e.g., client I/O is routed from the failed second application to the first application in the event the second application fails). The threshold condition may relate to the first application being configured as a redundant replica of the second application where clients can access data through either the first application or the second application (e.g., the applications may asynchronously replicate data to one another through snapshots over time). It may be appreciated that a variety of other factors may be taken into account to determine whether the threshold condition is met (e.g., whether the first and second applications are the same application type; whether one application generates a type of data/file that the other application can interpret; historical sharing of data; a same client or tenant owning or being associated with both applications; the applications being hosted within different regions or on different hardware for improved resiliency to failures; etc.).

As illustrated in FIG. 10A, in some embodiments, the distributed cluster of nodes (e.g., worker nodes) may comprise a first node 1006, a second node 1008, a third node 1010, and/or any other number of other worker nodes.

Each node within the distributed storage architecture 1000 may be implemented as a virtual machine, physical hardware, or other software/logical construct. In some embodiments, a node may be part of a Kubernetes cluster used to run containerized applications within containers. In some embodiments, a node may administer networking between containerized applications across the Kubernetes cluster or from outside the Kubernetes cluster. Implementing a node as a virtual machine or other software/logical construct provides an ability to easily create more nodes or deconstruct nodes on-demand in order to scale up or down in response to need for resources.

The nodes of the distributed cluster of nodes may host pods that are used to run and/or manage containers from the perspective of the container orchestration platform 1002. In some embodiments, a pod may be a smallest deployable unit of computing resources that can be created and managed by the container orchestration platform 1002 (e.g., Kubernetes). The pod may support multiple containers and may form a cohesive unit of service for the applications hosted within the containers. That is, the pod may provide access to shared storage, shared network resources, and/or a specification for how to run the containers grouped within the pod. In some embodiments, the pod may encapsulate an application composed of multiple co-located containers that share resources. These co-located containers may form a single cohesive unit of service provided by the pod, such as where one container provides client devices (clients) with access to files stored in a shared volume and another container updates the files on the shared volume. The pod may wrap these containers, storage resources, and network resources together as single unit that is managed by the container orchestration platform 1002.

A node may host multiple containers, and one or more pods may be used to manage these containers. In some embodiments, a first pod 1012 within the first node 1006 may manage a first container 1014 and/or other containers hosting applications that may interact with one another. Each node may host an operating system (OS) that may be shared by one or more containerized applications. In some embodiments, the first node 1006 may host an OS and a first application 1016 within the first container 1014. Because containers may share the host OS, the containers do not need to boot an OS or load libraries, thereby enabling containers to be much more efficient and lightweight. In some embodiments, containerized applications may start in seconds and many instances of each application may be hosted by the same node. In some embodiments, the first application 1016 may be, in some embodiments, a storage management application that communicates with and/or controls one or more storage devices in a storage platform.

A pod within a node may manage one or more containers. In some embodiments, a second pod 1018 within the second node 1008 may manage a second container 1020, which may host a second application 1022. In another example, the first pod 1012 may manage the first container 1014 (hosting the first application 1016) and a third container 1024 hosting a third application 1026, where each of the containers may host multiple applications that may interact with one another. A third pod 1027 within the third node 1010 may manage one or more containers, such as a fourth container 1028, a fifth container 1030, and a sixth container 1031, where each container may host applications that may interact with one another. A fourth pod 1032 within the third node 1010 may manage a plurality of containers 1034 hosting applications that may interact with one another.

In some embodiments, a container, such as the second container 1020, may be used to execute applications (e.g., a Kubernetes application, a client application, etc.) and/or services (e.g., storage management services) that provide clients with access to storage hosted and/or managed by the container orchestration platform 1002. In some embodiments, an application executing within the second container 1020 of the second node 1008 may provide clients with access to storage of a storage platform 1042. In some embodiments, a second application 1022 may be a file system service hosted through the second container 1020. The file system service may be accessed by clients in order to store and/or retrieve data within storage of the storage platform 1042. In some embodiments, the file system service may be an abstraction for a volume, which provides the clients with a mount point for accessing data stored through the file system service in the volume.

In some embodiments, a storage application within a first container (e.g., the fourth container 1028) may access a deduplication application within a second container (e.g., the fifth container 1030) and a compression application within a third container (e.g., the sixth container 1031) in order deduplicate and/or compress data managed by the storage application. Because these applications cooperate together, a single pod (e.g., the third pod 1027) may be used to manage the containers hosting these applications. Containers that are part of a pod may be co-located and scheduled on a same node (e.g., the third node 1010), such as the same physical hardware or virtual machine. Such co-location may allow the containers to share resources and/or dependencies, communicate with one another, and/or coordinate lifecycles of how and when the containers are terminated.

In some embodiments, a node, a pod within the node, a container within the node, and/or an application within the node may store data within storage (local storage) located within the same region of a multi-cloud environment. In some embodiments, the first node 1006 may store data within storage 1044, which is located within the same region of the multi-cloud environment as the first node 1006. In some embodiments, the distributed cluster of nodes may store data within distributed storage 1046. The distributed storage 1046 may correspond to storage devices that may be located at various nodes of the distributed cluster of nodes. In some embodiments, the distributed storage 1046 may correspond to storage devices that are located across various regions of a multi-cloud environment. Due to the distributed nature of the distributed storage 1046, data of a volume may be located across multiple storage devices that may be located at (e.g., physically attached to or managed by) different nodes of the distributed cluster of nodes. A particular node may be a current owner of the volume. However, ownership of the volume may be seamlessly transferred among different nodes. Such ownership transfer may allow applications, such as the file system service, to be migrated among containers and/or nodes, such as for load balancing, failover, and/or other purposes.

In order to improve I/O latency and client performance, a primary cache may be implemented for each node. The primary cache may be implemented utilizing relatively faster storage, such as NVRAM, flash, 3D Xpoint, NVDIMM, etc. In some embodiments, the first node 1006 may implement a primary cache using a persistent key-value store that is stored within storage 1044, such as NVRAM. In some embodiments, the storage 1044 may store the persistent key-value store used as the primary cache and/or may also store a non-volatile log (Nvlog). The Nvlog may be used by a storage operating system to log write operations before the write operations are stored into other storage such as storage hosting a volume managed by the storage operating system. In some embodiments, the persistent key-value store of the storage 1044 may include data of a first application (e.g., the first application 1016) hosted by a container (e.g., the first container 1014) located within a first region of a multi-cloud environment. In this case, the persistent key-value store of the storage 1044 may be available to be cached as cached data within a network edge of a second region (e.g., a storage device of the distributed storage 1046) for access by a second application (e.g., the second application 1022) hosted by a container (e.g., the second container 1020) located within a second region of a multi-cloud environment.

In some embodiments, a write operation may be received from a client application. The write operation may be quickly logged into the Nvlog because the Nvlog is stored within the storage 1044, which may be a relatively fast storage such as NVRAM. A response may be quickly provided back to the client application without writing the data of the write operation to a final destination in the distributed storage 1046. Accordingly, as write operations are received, the write operations are logged within the Nvlog. So that the Nvlog does not become full and run out of storage space for logging write operations, a consistency point may be triggered in order to replay the logged write operations and remove the logged write operations from the Nvlog, e.g., to free up storage space for logging write operations. In some embodiments, the consistency point and/or the logged write operations may be included in metadata that may be used by a storage operating system to determine that the second application has a threshold probability of accessing the data of the first application (e.g., the first application 1016).

When the Nvlog becomes full, reaches a certain fullness, or a certain amount of time has passed since a last consistency point was performed, the consistency point may be triggered such that the Nvlog does not run out of storage space for logging write operations. Once the consistency point is triggered, logged write operations are replayed from the Nvlog to write data of the logged write operations to the distributed storage 1046. Without the use of the Nvlog, the write operation may be executed across the distributed storage 1046 and/or data of the write operation may be distributed across the distributed storage 1046. Hence, a longer time may be taken than logging the write operation because the distributed storage 1046 may be comprised of relatively slower storage, the data may be stored across storage devices attached to other nodes, and/or the data may be stored across storage devices in other regions of the multi-cloud environment. Thus, without the Nvlog, latency experienced by the client application may be increased because a response from the write operation to the client may take longer. In contrast to the Nvlog, where write operations are logged for subsequent replay, read and write operations may be executed using a primary cache, set forth in greater detail herein.

Figure 10B:
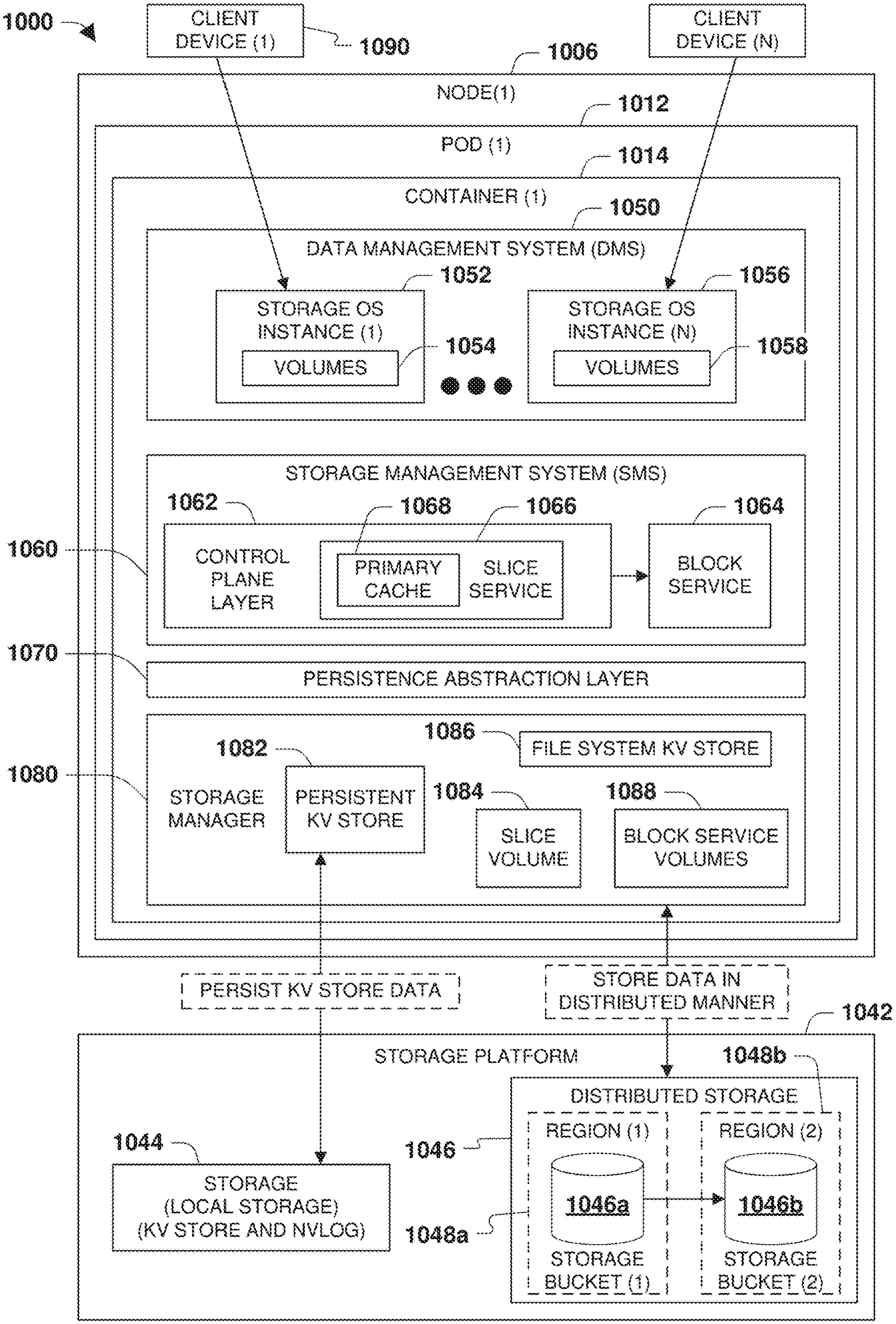
FIG. 10B is a block diagram illustrating an example of a node storing data within a storage platform in accordance with various embodiments of the present technology.

FIG. 10B illustrates an architecture of a worker node, such as the first node 1006, hosting the first container 1014, managed by the first pod 1012. The first container 1014 may execute an application, such as a storage application that provides client devices (clients) with access to data stored within the distributed storage 1046. The storage application may provide the clients with read and write access to their data stored within the distributed storage 1046 by the storage application. In some embodiments, the storage application includes a data management system (DMS), such as a data management system 1050, and a storage management system (SMS), such as a storage management system 1060, executing within the same container, such as the first container 1014.

In some embodiments, the data management system 1050 is a frontend component of the storage application through which client devices (clients) can access and interface with the storage application. In some embodiments, the data management system 1050 is configured to host one or more storage operating system instances, where each instance may manage one or more volumes configured to be exported to client devices (clients). In some embodiments, a first client device 1090 may transmit I/O operations to a first storage operating system instance 1052, hosted by the data management system 1050. The first client device 1090 may then manage data of volumes 1054 (e.g., FlexVols), such as import data, export data, perform a backup of the data, etc. The data management system 1050 may route these I/O operations to the storage management system 1060 of the storage application.

In some embodiments, the storage management system 1060 manages the actual storage of data within storage devices of the storage platform 1042, such as managing and tracking a location where the data is physically stored in particular storage devices. The storage management system 1060 may host a control plane layer 1062 that communicates with a block service 1064. The control plane layer 1062 may include a slice service 1066 that manages a primary cache 1068. In other words, the storage management system 1060 may also manage the caching of such data before the data is stored to the storage devices of the storage platform 1042.

In some embodiments, data may be cached through the primary cache 1068, which is backed by a persistent key-value store 1082 in a manner that reduces write amplification and/or improves performance compared to other types of caches that are not implemented as persistent key-value stores. In some embodiments, key-value record pairs can be resident within the persistent key-value store 1082 until data of the key-value record pairs is to be written to the distributed storage 1046 as a final destination. This reduces write amplification because the data is directly written from the persistent key-value store 1082 to the final destination within the distributed storage 1046, as opposed to being stored from the primary cache 1068 to an intermediate storage location that may not be the final destination.

Moreover, because the persistent key-value store 1082 is a persistent tier, the persistent key-value store does not rely upon a file system to offload data for long term storage. The persistent key-value store 1082 may reduce write amplification that would have been incurred from writing cached content from the primary cache 1068 to a volume, such as one of the volumes 1054, using a non-volatile log (Nvlog) of the file system. The persistent key-value store 1082 may reduce and/or eliminate subsequent re-writing of cached content from the volume to long term storage through a consistency point. Read operations can be locally served from the persistent key-value store 1082, which may reduce or avoid network hops to remote storage locations of the distributed storage that would otherwise introduce additional latency. In addition, the persistent key-value store 1082 may provide a tier which serves as a transient container for data. The persistent key-value store 1082 may provide other properties typically not associated with a cache (e.g., journaling, crash protections, resiliency, etc.), while also providing read/write I/O that can be accessed using a key-value interface.

Because the storage application, such as the data management system 1050 and/or the storage management system 1060 of the storage application, are hosted within the first container 1014, multiple instances of the storage application may be created and/or hosted within multiple containers. That is, multiple containers may be deployed to host instances of the storage application that may each service I/O requests from client devices (clients). The I/O may be load balanced across the instances of the storage application within the different containers. Load balancing may permit scaling of the storage application to meet demand by creating an on-demand number of containers to host instances of the storage application. In some embodiments, each container hosting an instance of the storage application may host a corresponding data management system and/or a corresponding storage management system of the storage application. These containers may be hosted, in some embodiments, on the first node 1006 and/or at other nodes. Such containers may be hosted at other nodes in a different region from the first node 1006 in accordance with the various embodiments of the present technology set forth herein. In some embodiments, a second application (e.g., a second storage application) may be hosted within a second container of the container orchestration platform 1002, wherein the second application is hosted at a second region of the multi-cloud environment different from the region of the first node 1006.

In some embodiments, the data management system 1050 may host one or more storage operating system instances, such as the first storage operating system instance 1052, which may be accessible to the first client device 1090 for storing data. In some embodiments, the first storage operating system instance 1052 may run on an operating system (e.g., Linux) as a process and may support various protocols, such as NFS, CIFS, and/or other file protocols through which client devices (clients) may access files. In some embodiments, the first storage operating system instance 1052 may provide an API layer through which client devices, such as the first client device 1090, may set configurations (e.g., a snapshot policy, an export policy, etc.), create and/or update settings (e.g., specifying a size or name for a volume), and/or transmit I/O operations directed to volumes 1054 (e.g., FlexVols) exported to the client devices by the first storage operating system instance 1052. In some embodiments, the client devices may communicate with the first storage operating system instance 1052 through the API layer. In some embodiments, the data management system 1050 and/or the storage management system 1060 may be specific to the first node 1006 (e.g., as opposed to an embodiment as a distributed component(s) among nodes of the distributed cluster of nodes). In some embodiments, the data management system 1050 and/or the storage management system 1060 may be hosted within the first container 1014, managed by the first pod 1012, on the first node 1006.

In some embodiments, the first storage operating system instance 1052 may comprise an operating system stack that includes a protocol layer (e.g., a layer implementing NFS, CIFS, etc.), a file system layer, a storage layer (e.g., a RAID layer), etc. The first storage operating system instance 1052 may provide various techniques for communicating with storage, such as through ZAPI commands, REST API operations, etc. The first storage operating system instance 1052 may be configured to communicate with the storage management system 1060 through iSCSI, remote procedure calls (RPCs), etc. In some embodiments, the first storage operating system instance 1052 may communicate with virtual disks provided by the storage management system 1060 to the data management system 1050, such as through ISCSI, RPCs, and/or other communication protocols.

In some embodiments, the storage management system 1060 may be implemented by the first node 1006 as a storage backend. In some embodiments, the storage management system 1060 may be implemented as a distributed component with instances that are hosted on each of the nodes of the distributed cluster of nodes. The storage management system 1060 may host the control plane layer 1062, as set forth herein. The control plane layer 1062 may host a full operating system, including a frontend storage system and a backend storage system. The control plane layer 1062 may form a control plane that includes control plane services, such as a slice service 1066 that manages slice files used as indirection layers for accessing data on disk, a block service 1064 that manages block storage of the data on disk, a transport service used to transport commands through a persistence abstraction layer 1070 to a storage manager 1080, and/or other control plane services. The slice service 1066 may be implemented as a metadata control plane and the block service 1038 may be implemented as a data control plane. Because the storage management system 1060 may be implemented as a distributed component, the slice service 1066 and the block service 1064 may communicate with one another on the first node 1006 and/or may communicate (e.g., through remote procedure calls) with other instances of the slice service 1066 and/or the block service 1064 hosted at other nodes within the distributed cluster of nodes.

In some embodiments, the slice service 1066 may be hosted in one region of a multi-cloud environment and the block service may be hosted in a second region of the multi-cloud environment. In some embodiments, the slice service 1066 may be hosted as a first application within a first container of a container orchestration platform spanning across multiple regions of a multi-cloud environment, wherein the first application is hosted at a first region of the multi-cloud environment. In this example, the block service 1064 may be hosted as a second application within a second container of the container orchestration platform, wherein the second application is hosted at a second region of the multi-cloud environment. In this example, another application, such as one of the plurality of storage operating instances 1056 managing data in one of the plurality of volumes 1058, may store data of the first application within storage located within the first region of the multi-cloud environment. In response to determining that the second application has a threshold probability of accessing the data of the first application, the one of the plurality of storage operating instances 1056 may cache the data as cached data within a network edge of the second region for access by the second application, such as another primary cache in a corresponding storage management system in the second region of the multi-cloud environment.

In some embodiments, the slice service 1066 may utilize slices, such as slice files, as indirection layers. The first node 1006 may provide the first client device 1090 with access to a logical unit number (LUN) or volume through the data management system 1050. In this example, the LUN may be a slice or portion of a configured set of disks that is presentable to a host and mounted as a volume within an operating system (OS). The LUN may have N logical blocks such as in some embodiments, 10 KB each. If one of the logical blocks is in use and storing data, then the in-use logical block may have a block identifier of a block storing the actual data. A slice file for the LUN (or volume) may have mappings that map logical block numbers of the LUN (or volume) to block identifiers of the blocks storing the actual data. In some embodiments, each LUN or volume may have a slice file, such that there may be hundreds of slice files that may be distributed among the nodes of the distributed cluster of nodes. A slice file may be replicated so that there is a primary slice file and one or more secondary slice files that are maintained as copies of the primary slice file. When write operations and/or delete operations are executed, corresponding mappings that are affected by these operations may be updated within the primary slice file. The updates to the primary slice file may be replicated to the one or more secondary slice files. After an update, the write or deletion operations may be responded back to a client device (client) as successful. Read operations may be served from the primary slice because the primary slice may be an authoritative source of logical block to block identifier mappings. In some embodiments, data (e.g., a file, a slice file, etc.) may be stored within a first storage bucket 1046*a* in a first region 1048*a* of the multi-cloud environment. A cross-region replication operation may be performed to replicate the data (e.g., the file, the slice file, etc.) from the first storage bucket 1046*a* to a second storage bucket 1046*b* as cached data in a second region 1048*b* of the multi-cloud environment. Containers may then be provisioned (e.g., by the data management system 1050) within the first region 1048*a* and the second region 1048*b* with shared access to the data through the first storage bucket 1046*a* and the second storage bucket 1046*b*.

In some embodiments, the control plane layer 1062 may not directly communicate with the storage platform 1042, but may instead communicate through the persistence abstraction layer 1070 to a storage manager 1080 that manages the storage platform 1042. In some embodiments, the storage manager 1080 may comprise storage operating system functionality running on an operating system (e.g., Linux). The storage operating system functionality of the storage manager 1080 may run directly from internal APIs (e.g., as opposed to protocol access) received through the persistence abstraction layer 1070. In some embodiments, the control plane layer 1062 may transmit I/O operations through the persistence abstraction layer 1070 to the storage manager 1080 using the internal APIs. In some embodiments, the slice service 1066 may transmit I/O operations through the persistence abstraction layer 1070 to a slice volume 1084 hosted by the storage manager 1080 for the slice service 1066. In this example, slice files and/or metadata may be stored within the slice volume 1084 and exposed to the slice service 1066 by the storage manager 1080.

In some embodiments, the storage manager 1080 may expose a file system key-value store 1086 to the block service 1064. The block service 1064 may then access block service volumes 1088 through the file system key-value store 1086 in order to store and retrieve key-value store metadata and/or data. The storage manager 1080 may be configured to directly communicate with a storage device of the storage platform 1042, such as the distributed storage 1046 and/or the storage 1044 (e.g., NVRAM). In some embodiments, the storage 1044 may be used to host a persistent key-value store 1082, which is managed by the storage manager 1080, for use as a primary cache 1068 by the slice service 1066 of the control plane layer 1062.

In some embodiments, the container orchestration platform 1002 may be managed in an on-premises server, or may be managed in, in some embodiments, a Kubernetes server. In some embodiments, the platform 1002 may manage N number of applications, such as a relational database management system (RDBMS), such as POSTGRES, MySQL, etc., or an automation server, such as Jenkins. It may be appreciated that the container orchestration platform 1002 of FIGS. 10A and 10B is merely one example of a computing environment within which the techniques described herein may be implemented, and that the techniques described herein may be implemented in other types of computing environments (e.g., a cluster computing environment of nodes such as virtual machines or physical hardware, a non-containerized environment, a cloud computing environment, a hyperscaler, etc.).

Figure 11:
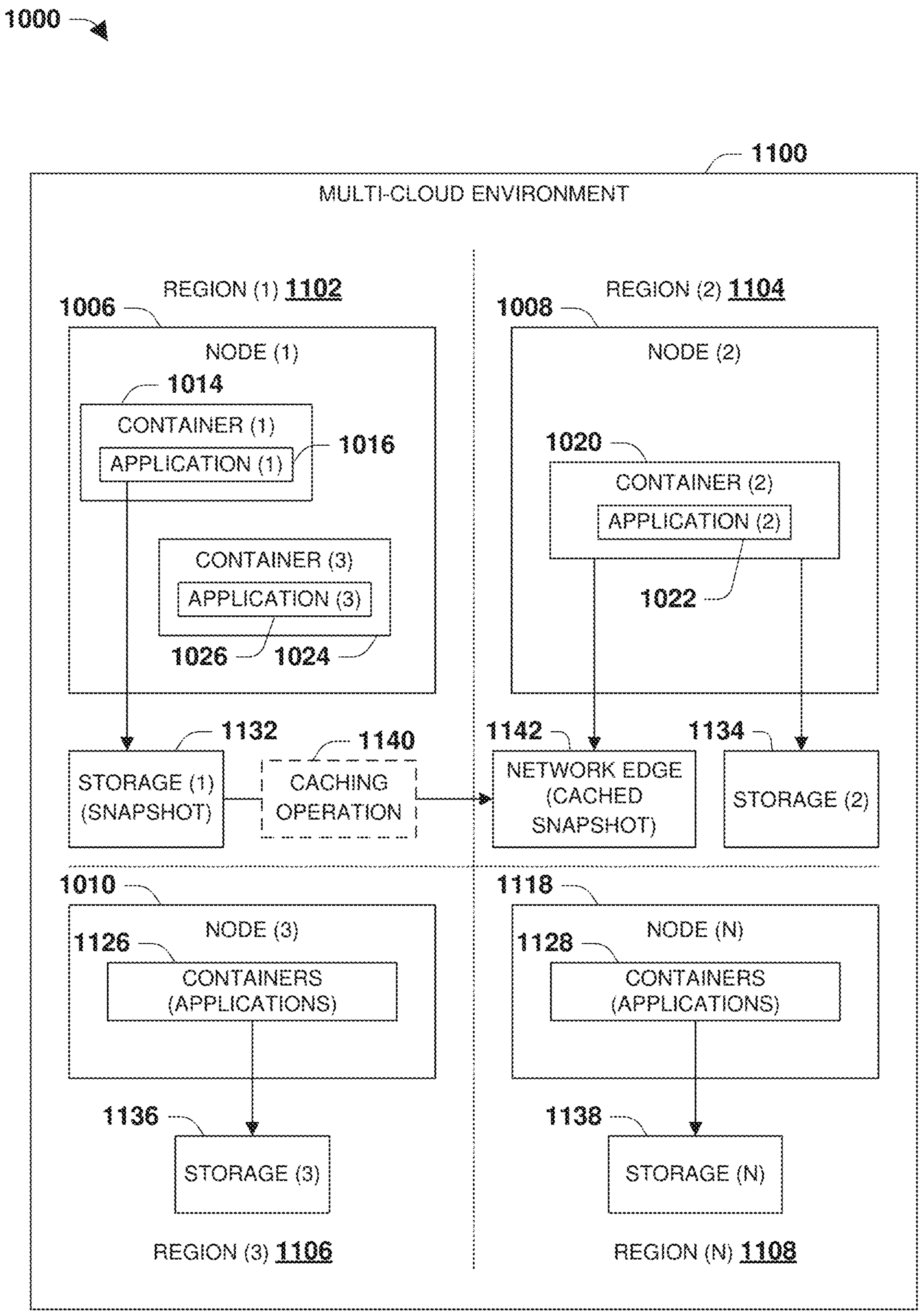
FIG. 11 is a block diagram illustrating an example of nodes of a container orchestration platform spanning across multiple regions of a multi-cloud environment in accordance with various embodiments of the present technology.

FIG. 11 is a block diagram illustrating an example of a distributed storage architecture 1000 implementing a cloud environment 1100 (e.g., a cloud environment spanning multiple regions, a multi-cloud environment, etc.) in accordance with various embodiments of the present technology. In some embodiments, the cloud environment 1100 may include multiple geographical regions, such as a first region 1102, a second region 1104, a third region 1106, and/or an Nth region 1108. The container orchestration platform 1002 may span across the multiple regions of the cloud environment 1100. In some embodiments, the first region 1102 may be a first continent, the second region 1104 may be a second continent, the third region 1106 may be a third continent, etc. In some embodiments, the first region 1102 may include the first node 1006, the second region 1104 may include the second node 1008, the third region 1106 may include the third node 1010, and the Nth region 1108 may include an Nth node 1118. The first node 1006 may include the first container 1014 hosting the first application 1016 to control data storage and retrieval within a first storage 1132 in the first region 1102. The second node 1008 may include the second container 1020 hosting the second application 1022 to control data storage and retrieval within a second storage 1134 in the second region 1104. The third node 1010 may include third node containers 1126 hosting third applications to control data storage and retrieval within a third storage 1136 in the third region 1106. The Nth node 1118 may include Nth node containers 1128 hosting Nth applications to control data storage and retrieval within Nth storage 1138 in the Nth region 1108.

In some embodiments, the first application 1016, such as a file service running in the first region 1102 (e.g., the US Eastern region), may generate a snapshot that is stored within the first storage 1132 of the US Eastern region. The second application 1022 running in the second region 1104 (e.g., the US Western region) may want to perform a restore operation using the snapshot. As part of performing the restore operation, cross region replication/cloning can be provided between the first region 1102 and the second region 1104. In some embodiments, the first container 1014 may perform a caching operation 1140 to cache the data in the first storage 1132 (e.g., the snapshot) and transfer the data to a network edge 1142 (e.g., as a cached snapshot) in the second region 1104. In some embodiments, the caching operation 1140 may be performed based upon a determination that the second application 1022 within the second region 1104 has a threshold probability of accessing the snapshot (e.g., the second application 1022 historically accessing data of the first application 1016; the second application 1022 previously performing restore operations using snapshots created by the first application 1016; the second application 1022 being configured as a failover partner for the first application 1016; the second application 1022 being configured as a replica of the first application 1016; etc.).

In some embodiments, the first container 1014 may partition the first storage 1132 in the first region 1102 of the cloud environment 1100 to create a first partition and a second partition, wherein the data is stored in the first partition of the first storage 1132. The first node 1006 may host the third application 1026 within the third container 1024 of the container orchestration platform 1002, wherein the third application 1026 is hosted at the first region 1102 of the cloud environment 1100. The third application 1026 may perform a cloning operation to clone the data from the first partition to the second partition as cloned data and cache the cloned data as the cached data (e.g., the cached snapshot) within the network edge 1142 of the second region 1104 for access by the second application 1022 hosted by the second container 1020.

In some embodiments, the first node 1006 may register the first application 1016 with the second application 1022, such as a lifecycle management application, wherein the lifecycle management application is configured to instruct the third application 1026 to perform the cloning operation of the data. The lifecycle management application may instruct, after registering the first application 1016 with the lifecycle management application, the third application 1026 to perform the cloning operation.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. In some embodiments, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. In some embodiments, a first set of information and a second set of information generally correspond to set of information A and set of information B or two different or two identical sets of information or the same set of information.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

storing data within a first storage bucket in a first region of a multi-cloud environment, wherein the data is made available to a first application hosted within the first region;

constructing a unified cloud user interface for accessing the data by client devices within multiple regions of the multi-cloud environment;

evaluating operation of a second application hosted within a second region of the multi-cloud environment to detect that the second application has a probability of accessing the data;

performing a cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket using the unified cloud user interface.

2. The method of claim 1, comprising:

receiving predictions from a trained machine learning model indicating the probability of accessing the data by the second application.

3. The method of claim 1, comprising:

in response to determining that the second application has the probability of accessing the data of the first application, asynchronously caching the data as cached data through the second storage bucket.

4. The method of claim 1, comprising:

registering the first application with a lifecycle management application that instructs a third application to perform the cross-region replication operation of the data.

5. The method of claim 4, comprising:

instructing, by the lifecycle management application, the third application to perform the cross-region replication operation based upon the first application has registered with the lifecycle management application.

6. The method of claim 1, comprising:

providing, by the unified cloud user interface to a first client device connected to the first region within the multi-cloud environment, information identifying the data stored within the first bucket in the first region; and providing, by the unified cloud user interface to a second client device connected to the second region within the multi-cloud environment, information identifying the data replicated to the second bucket in the second region.

7. The method of claim 1, comprising:

populating the unified cloud user interface with information identifying content and cached content stored across the multiple regions of the multi-cloud environment.

8. A computing device, comprising:

a memory comprising machine executable code; and a processor coupled to the memory, the processor configured to execute the machine executable code to cause the computing device to perform operations comprising:

storing data within a first storage bucket in a first region of a multi-cloud environment, wherein the data is made available to a first application hosted within the first region;

constructing a unified cloud user interface for accessing the data by client devices within multiple regions of the multi-cloud environment;

evaluating operation of a second application hosted within a second region of the multi-cloud environment to detect that the second application has a probability of accessing the data;

performing a cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket using the unified cloud user interface.

9. The computing device of claim 8, wherein the operations further comprise:

receiving predictions from a trained machine learning model indicating the probability of accessing the data by the second application.

10. The computing device of claim 8, wherein the operations further comprise:

in response to determining that the second application has the probability of accessing the data of the first application, asynchronously caching the data as cached data through the second storage bucket.

11. The computing device of claim 8, wherein the operations further comprise:

registering the first application with a lifecycle management application that instructs a third application to perform the cross-region replication operation of the data.

12. The computing device of claim 11, wherein the operations further comprise:

instructing, by the lifecycle management application, the third application to perform the cross-region replication operation based upon the first application has registered with the lifecycle management application.

13. The computing device of claim 8, wherein the operations further comprise:

providing, by the unified cloud user interface to a first client device connected to the first region within the multi-cloud environment, information identifying the data stored within the first bucket in the first region; and providing, by the unified cloud user interface to a second client device connected to the second region within the multi-cloud environment, information identifying the data replicated to the second bucket in the second region.

14. The computing device of claim 8, wherein the operations further comprise:

populating the unified cloud user interface with information identifying content and cached content stored across the multiple regions of the multi-cloud environment.

15. A non-transitory machine readable medium comprising instructions for performing a method, which when executed by a machine, causes the machine to perform operations comprising:

storing data within a first storage bucket in a first region of a multi-cloud environment, wherein the data is made available to a first application hosted within the first region;

constructing a unified cloud user interface for accessing the data by client devices within multiple regions of the multi-cloud environment;

evaluating operation of a second application hosted within a second region of the multi-cloud environment to detect that the second application has a probability of accessing the data;

performing a cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket using the unified cloud user interface.

16. The non-transitory machine readable medium of claim 15, wherein the operations further comprise:

receiving predictions from a trained machine learning model indicating the probability of accessing the data by the second application.

17. The non-transitory machine readable medium of claim 15, wherein the operations further comprise:

in response to determining that the second application has the probability of accessing the data of the first application, asynchronously caching the data as cached data through the second storage bucket.

18. The non-transitory machine readable medium of claim 15, wherein the operations further comprise:

registering the first application with a lifecycle management application that instructs a third application to perform the cross-region replication operation of the data.

19. The non-transitory machine readable medium of claim 18, wherein the operations further comprise:

instructing, by the lifecycle management application, the third application to perform the cross-region replication operation based upon the first application has registered with the lifecycle management application.

20. The non-transitory machine readable medium of claim 15, wherein the operations further comprise:

populating the unified cloud user interface with information identifying content and cached content stored across the multiple regions of the multi-cloud environment.

21. A method, comprising:

storing data within a first storage bucket in a first region of a multi-cloud environment, wherein the data is made available to a first application hosted within the first region;

evaluating operation of a second application hosted within a second region of the multi-cloud environment to detect that the second application has a probability of accessing the data;

registering the first application with a lifecycle management application for instructing a third application to perform cross-region replication operation of the data;

performing, by the third application based upon an instruction from the lifecycle management application, the cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket.

22. The method of claim 21, comprising:

constructing a unified cloud user interface for accessing the data by client devices within multiple regions of the multi-cloud environment.

23. The method of claim 22, comprising:

populating the unified cloud user interface with information identifying content and cached content stored across the multiple regions of the multi-cloud environment.

24. A computing device comprising:

a memory storing instructions; and a processor coupled to the memory, the processor configured to execute the instructions to cause the computing device to perform operations comprising:

storing data within a first storage bucket in a first region of a multi-cloud environment, wherein the data is made available to a first application hosted within the first region;

evaluating operation of a second application hosted within a second region of the multi-cloud environment to detect that the second application has a probability of accessing the data;

registering the first application with a lifecycle management application for instructing a third application to perform cross-region replication operation of the data;

performing, by the third application based upon an instruction from the lifecycle management application, the cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket.

25. The computing device of claim 24, wherein the operations further comprise:

constructing a unified cloud user interface for accessing the data by client devices within multiple regions of the multi-cloud environment.

26. The computing device of claim 25, wherein the operations further comprise populating the unified cloud user interface with information identifying content and cached content stored across the multiple regions of the multi-cloud environment.

27. A non-transitory machine readable medium comprising instructions for performing a method, which when executed by a machine, causes the machine to perform operations comprising:

storing data within a first storage bucket in a first region of a multi-cloud environment, wherein the data is made available to a first application hosted within the first region;

evaluating operation of a second application hosted within a second region of the multi-cloud environment to detect that the second application has a probability of accessing the data;

registering the first application with a lifecycle management application for instructing a third application to perform cross-region replication operation of the data;

performing, by the third application based upon an instruction from the lifecycle management application, the cross-region replication operation to replicate the data from the first storage bucket to a second storage bucket in the second region of the multi-cloud environment based upon the second application having the probability of accessing the data; and provisioning containers within the first region and the second region for hosting the first application and the second application with shared access to the data through the first storage bucket and the second storage bucket.

28. The non-transitory machine readable medium of claim 27, wherein the operations comprise:

constructing a unified cloud user interface for accessing the data by client devices within multiple regions of the multi-cloud environment.

29. The non-transitory machine readable medium of claim 28, wherein the operations comprise:

populating the unified cloud user interface with information identifying content and cached content stored across the multiple regions of the multi-cloud environment.

* * * * *